US012387665B2

(12) United States Patent
Kwon et al.

(10) Patent No.: US 12,387,665 B2
(45) Date of Patent: Aug. 12, 2025

(54) ELECTRONIC DEVICE

(71) Applicant: SAMSUNG DISPLAY CO., LTD., Yongin-si (KR)

(72) Inventors: Myoung-Ho Kwon, Yongin-si (KR); Jeongkug Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/767,093

(22) Filed: Jul. 9, 2024

(65) Prior Publication Data

US 2025/0095555 A1 Mar. 20, 2025

(30) Foreign Application Priority Data

Sep. 15, 2023 (KR) ........................ 10-2023-0123220

(51) Int. Cl.

| | |
|---|---|
| ***G11B 11/16*** | (2006.01) |
| ***G09G 3/32*** | (2016.01) |
| ***G11B 3/70*** | (2006.01) |

(52) U.S. Cl.

CPC ....... *G09G 3/32* (2013.01); *G09G 2310/0275* (2013.01); *G09G 2310/08* (2013.01); *G09G 2320/041* (2013.01); *G09G 2330/028* (2013.01); *G09G 2380/02* (2013.01)

(58) Field of Classification Search

CPC ............. G09G 3/32; G09G 2310/0275; G09G 2310/08; G09G 2320/041; G09G 2330/028; G09G 2380/02; G09G 3/035; G09G 3/3233

See application file for complete search history.

(56) References Cited

U.S. PATENT DOCUMENTS 10,262,588 B2 * 4/2019 Yoon .................... G09G 3/3233
10,810,942 B2 * 10/2020 Pyo ...................... G09G 3/3258

FOREIGN PATENT DOCUMENTS

KR 10-2017-0080883 A 7/2017
KR 10-2533763 B1 5/2023

* cited by examiner

*Primary Examiner* — Andrew Sasinowski
(74) *Attorney, Agent, or Firm* — CHAU & ASSOCIATES, LLC

(57) ABSTRACT

Provided is an electronic device comprising a display panel in which a first display region and a second display region are defined and which has a first pixel and a second pixel, a first temperature sensor which measures a first temperature of the first display region, a second temperature sensor which measures a second temperature of the second display region, a voltage generator which generates a first initialization voltage and a second initialization voltage, and a driving controller. The driving controller may generate a voltage control signal on the basis of the first temperature and the second temperature, and the voltage generator may provide, on the basis of the voltage control signal, the first initialization voltage to the first pixel and the second initialization voltage to the second pixel.

20 Claims, 16 Drawing Sheets

ELECTRONIC DEVICE

CROSS-REFERENCE TO RELATED APPLICATIONS

This U.S. non-provisional patent application claims priority under 35 U.S.C. § 119 of Korean Patent Application No. 10-2023-0123220, filed on Sep. 15, 2023, the entire contents of which are incorporated by reference.

BACKGROUND

The present disclosure generally relates to an electronic device. More particularly, the present disclosure relates to an electronic device with improved display quality.

In general, electronic devices for displaying images include cellphones, digital cameras, laptop computers, navigation systems, and smart televisions, among other electronic apparatuses that offer images to a user. The images are produced by the electronic devices and are shown to the user on a display screen.

With the advancement of technology in electronic devices, diverse shaped electronic devices are being created lately. For instance, a variety of flexible electronic devices that can be folded or rolled, or twisted into a curved shape, are being created. Flexible electronic devices is easier to carry due to its size reduction, and thus improves user's convenience.

SUMMARY

The present disclosure provides an electronic device with improved display quality.

An embodiment of the present disclosure provides an electronic device including: a display panel including a first display region and a second display region, wherein the first display region is spaced apart from the second display region in a first direction, and wherein the first display region includes a plurality of pixels having a first pixel, and the second display region includes a plurality of pixels having a second pixel; a first temperature sensor configured to measure a first temperature of the first display region; a second temperature sensor configured to measure a second temperature of the second display region; a voltage generator configured to generate a first initialization voltage and a second initialization voltage which is different from the first initialization voltage; and a driving controller configured to control the voltage generator, wherein the driving controller may generate a voltage control signal based on the first temperature and the second temperature, and the voltage generator may provide the first initialization voltage to the first pixel and the second initialization voltage to the second pixel based on the voltage control signal.

In an embodiment, the electronic device may further include a processor which drives the driving controller, and which overlaps the display panel.

In an embodiment, the processor may be disposed under the second display region when viewed on a plane.

In an embodiment, the first temperature sensor may be disposed under the first display region when viewed on a plane, and the second temperature sensor may be disposed under the second display region when viewed on the plane.

In an embodiment, the first temperature may be different from the second temperature.

In an embodiment, the voltage generator may further provide a power supply voltage to the plurality of pixels based on the voltage control signal.

In an embodiment, when the first temperature is lower than the second temperature, an absolute value of the first initialization voltage is less than an absolute value of the second initialization voltage.

In an embodiment, the power supply voltage may include a first voltage and a second voltage which is different from the first voltage, and the first voltage may be provided to the first pixel and the second voltage may be provided to the second pixel.

In an embodiment, when the first temperature is lower than the second temperature, the driving controller may control at least one of the second voltage or the second initialization voltage so that a voltage value obtained by subtracting the second initialization voltage from the second voltage is positive.

In an embodiment, the display panel may be folded with respect to a folding axis in parallel with a second direction crossing the first direction, and the folding axis may be defined by and interposed between the first display region and the second display region.

In an embodiment of the present disclosure, an electronic device includes: a display panel including a first display region and a second display region, wherein the first display region and the second display are spaced apart from each other in a first direction, and wherein the first display region includes a plurality of pixels having a first pixel, and the second display region includes a plurality of pixels having a second pixel; a first temperature sensor configured to measure a first temperature of the first display region; a second temperature sensor configured to measure a second temperature of the second display region; a data driving circuit configured to provide a data signal to control each of the plurality of pixels; and a driving controller configured to control the data driving circuit, wherein the driving controller may generate a data control signal based on a difference between the first temperature and the second temperature, and the data driving circuit may control the data signal based on the data control signal from the driving controller.

In an embodiment, the electronic device may further include a processor which drives the driving controller, and which overlaps the display panel.

In an embodiment, the processor may be disposed under the second display region when viewed on a plane.

In an embodiment, the first temperature sensor may be disposed under the first display region when viewed on a plane, and the second temperature sensor may overlap the second display region when viewed on the plane.

In an embodiment, the first temperature may be different from the second temperature.

In an embodiment, the data signal may include a first portion provided to the first display region and a second portion provided to the second display region, and a first average value of a voltage level in the first portion is different from a second average value of a voltage level in the second portion.

In an embodiment, the first average value may be lower than the second average value.

In an embodiment, a folding display region interposed between the first display region and the second display region may be further defined in the display panel, and the folding display region may be foldable with respect to a folding axis in parallel with a second direction crossing the first direction.

In an embodiment, the data signal may further include a third portion provided to the folding display region, the third portion may be provided between the first portion and the second portion, and the data driving circuit may gradually increase a third average value of a voltage level in the third portion.

In an embodiment, the data signal may include a plurality of high levels and a plurality of low levels respectively having lower voltage level than the plurality of high levels, the plurality of high levels and the plurality of low levels may each be repeated, and each of the plurality of high levels in the third portion may be greater than the plurality of high levels in the first portion and smaller than the plurality of high levels in the second portion.

In an embodiment of the present disclosure, an electronic device includes: a display panel including a first display region, a second display region, and a folding display region, wherein the first display region, the second display, and the folding display region are spaced apart from each other in a first direction, wherein the folding display region is interposed between the first and second display regions, and wherein the first display region includes a plurality of first pixels, the second pixel includes a plurality of second pixels, and the folding display region includes a plurality of third pixels; a first temperature sensor configured to measure a first temperature of the first display region; a second temperature sensor configured to measure a second temperature of the second display region; a data driving circuit configured to provide a data signal to control each of the plurality of pixels; a driving controller configured to control the data driving circuit; and a processor configured to drive the driving controller and disposed under the second display region, wherein the driving controller generates a data control signal based on a difference between the first temperature and the second temperature, wherein the data driving circuit controls the data signal based on the data control signal from the driving controller, wherein the data signal includes a first portion provided to the first display region, a second portion provided to the second display region, and a third portion provided to the folding display region, wherein the data signal includes a plurality of high levels and a plurality of low levels respectively having lower voltage level than the plurality of high levels, wherein the plurality of high levels include first, second, and third high levels, and the plurality of low levels include first, second, and third low levels, wherein each of the plurality of high levels in the third portion is greater than the plurality of high levels in the first portion, and smaller than the plurality of high levels in the second portion, and wherein each of the plurality of low levels in the third portion is greater than the plurality of low levels in the first portion, and smaller than the plurality of low levels in the second portion.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain principles of the present disclosure. In the drawings.

DETAILED DESCRIPTION

Figure 1A:
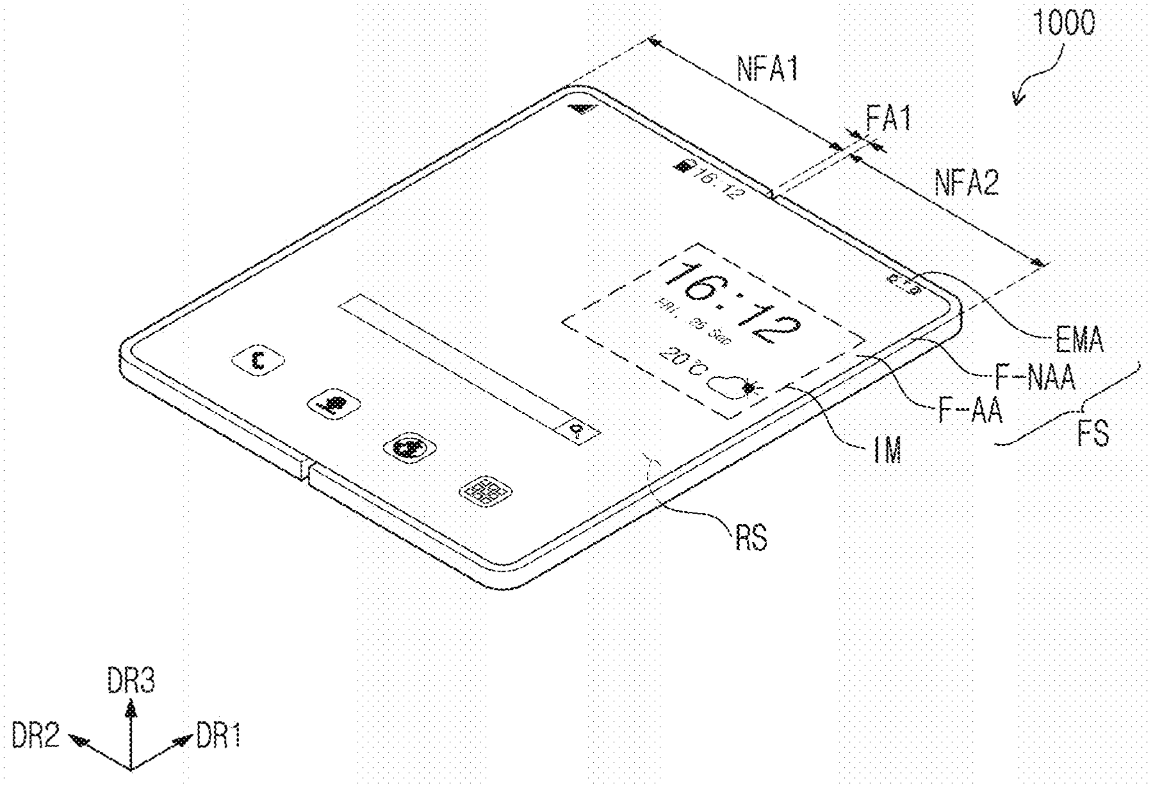
FIG. 1A is a perspective view illustrating an unfolded state of an electronic device according to an embodiment of the present disclosure.

In this specification, it will be understood that when an element (or a region, a layer, a portion, or the like) is referred to as being "on", "connected to" or "coupled to" another element, it may be directly disposed on, connected or coupled to the other element, or intervening elements may be disposed therebetween.

Like numbers refer to like elements throughout. Also, in the drawings, the thickness and the ratio and the dimension of the elements are exaggerated for effective description of the technical contents. The term "and/or" includes all of one or more combinations which can be defined by related elements.

It will be understood that, although the terms first, second, etc. may be used herein to describe various elements, these elements should not be limited by these terms. These terms are only used to distinguish one element from another element. For example, a first element may be referred to as a second element, and similarly, a second element may also be referred to as a first element without departing from the scope of the present disclosure. The singular forms include the plural forms as well, unless the context clearly indicates otherwise.

Also, terms of "below", "on lower side", "above", "on upper side", or the like may be used to describe the relationships of the elements illustrated in the drawings. These terms have relative concepts and are described on the basis of the directions indicated in the drawings.

It will be understood that the term "includes" or "comprises", when used in this specification, specifies the presence of stated features, integers, steps, operations, elements, components, or a combination thereof, but does not preclude the presence or addition of one or more other features, integers, steps, operations, elements, components, or combinations thereof.

Unless otherwise defined, all terms (including technical and scientific terms) used herein have the same meaning as commonly understood by one of ordinary skills in the art to which the present disclosure belongs. Also, terms, such as those defined in commonly used dictionaries, should be interpreted as having a meaning that is consistent with their meaning in the context of the relevant art and should not be interpreted in an idealized or overly formal sense unless expressly so defined herein.

Hereinafter, embodiments of the present disclosure will be described with reference to the drawings.

FIG. 1A is a perspective view illustrating an unfolded state of an electronic device according to an embodiment of the present disclosure.

Referring to FIG. 1A, an electronic device 1000 is a device which is activated in response to an electrical signal. For example, the electronic device 1000 may be a mobile phone, a tablet PC, a car navigation system, a game console, or a wearable device, but an embodiment of the present disclosure is not limited thereto. In this specification, the electronic device 1000 is illustrated as a mobile phone.

The electronic device 1000 may include a first display surface FS defined by a first direction DR1 and a second direction DR2 crossing the first direction DR1. The electronic device 1000 may provide an image IM to a user through the first display surface FS. The image IM may include a static image as well as a dynamic image. In FIG. 1A, a clock window and icons are illustrated as an example of the image IM. The electronic device 1000 may display the image IM in a third direction DR3 on the first display surface FS which is in parallel with each of the first direction DR1 and the second direction DR2. A front surface (or a top surface) and a rear surface (or a bottom surface) of each component may be defined on the basis of a direction in which the image IM is displayed. A front surface and a rear surface may be disposed opposite to each other in the third direction DR3, and the normal directions of the front surface and the rear surface may each be parallel to the third direction DR3.

The first display surface FS may include a first active region F-AA and a first peripheral region F-NAA. An electronic module region EMA may be included in the first active region F-AA. The electronic device 1000 may transmit and receive a signal of an electro-optical module ELM (see FIG. 3) through the electronic module region EMA. When viewed on a plane, the electronic module region EMA may overlap a camera module CAM (see FIG. 3) and a sensor module SNM (see FIG. 3). The electronic device 1000 may display the image IM through the first active region F-AA. In addition, various forms of external inputs may be sensed in the first active region F-AA. The first peripheral region F-NAA may be disposed adjacent to the first active region F-AA. In this example, the first peripheral region F-NAA may surround the first active region F-AA. The first peripheral region F-NAA may have a predetermined color. Thus, a user may distinguish the first active region F-AA and the first peripheral region F-NAA. Accordingly, a shape of the first active region F-AA may be defined substantially by the first peripheral region F-NAA. However, this is an example, and the first peripheral region F-NAA may be disposed adjacent to only one side of the first active region F-AA, or may be omitted. For example, in this case, the first peripheral region F-NAA may not entirely surround the first active region F-AA. The electronic device 1000 according to an embodiment of the present disclosure may include various shapes of active regions, but is not limited to any one embodiment.

The electronic device 1000 may include a second display surface RS. The second display surface RS may be defined as a surface facing at least a portion of the first display surface FS. For example, the second display surface RS may be defined as a portion of a rear surface of the electronic device 1000. In an in-folded state, the second display surface RS may be viewed by a user.

The electronic device 1000 may sense an external input applied from the outside. The external input may include various forms of inputs supplied from the outside of the electronic device 1000. For example, the external input may include an external input (for example, hovering) applied close to the electronic device 1000 or adjacent by a predetermined distance to the electronic device 1000 as well as a touch by a user's body part such as a hand or the like. In addition, the external input may include various forms such as physical force, pressure, heat, light, etc. In addition, any type of electrical pencil may be used as an input source.

Meanwhile, in FIG. 1A and following drawings, the first direction DR1 to the third direction DR3 are illustrated, but the directions indicated by the first to third directions DR1, DR2, and DR3 illustrated in this specification may have a relative concept and may thus be changed to other directions. In addition, the directions indicated by the first to third directions DR1, DR2, and DR3 may be referred to as first to third directions, and thus denoted as the same reference numerals or symbols.

The electronic device 1000 may include at least one folding region FA1 and non-folding regions NFA1 and NFA2 adjacent to the folding region FA1. The non-folding regions NFA1 and NFA2 may be spaced apart from each other with respect to the folding region FA1 interposed therebetween.

Figure 1B:
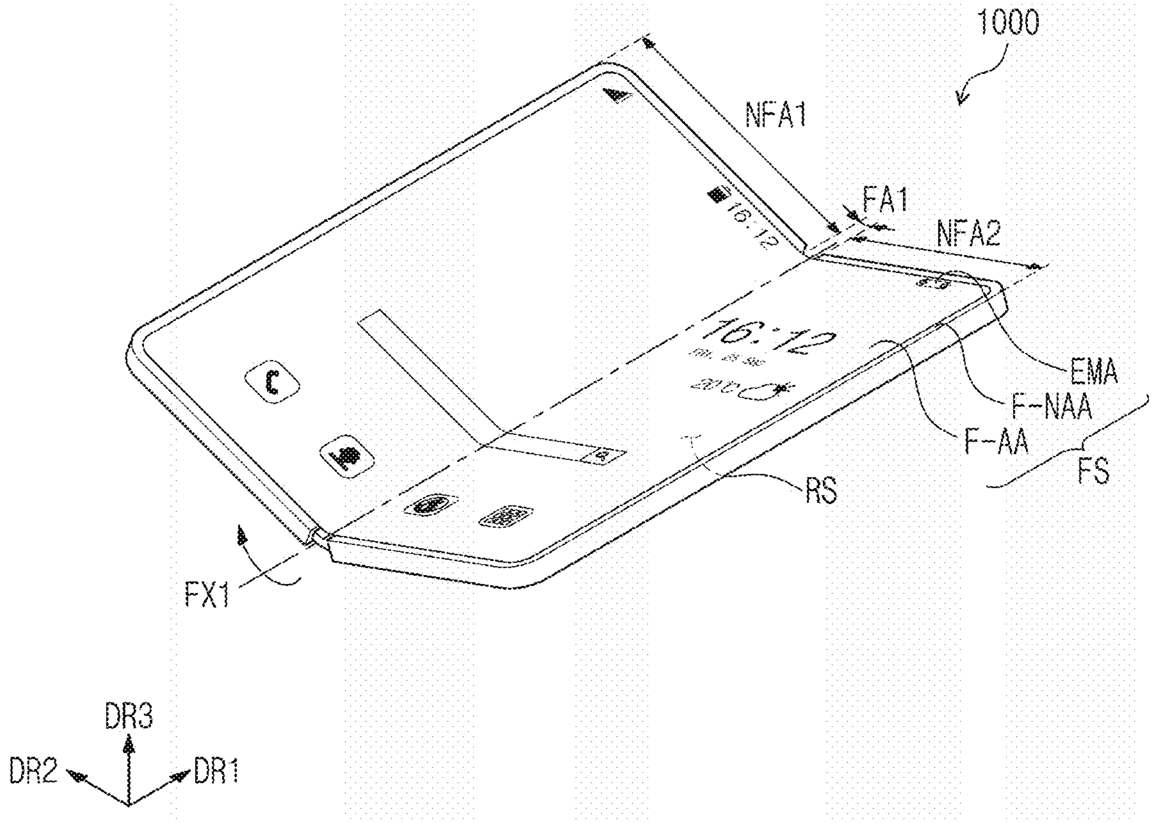
FIG. 1B is a perspective view illustrating an in-folding process of the electronic device illustrated in FIG. 1A.

FIG. 1B is a perspective view illustrating an in-folding process of the electronic device illustrated in FIG. 1A.

Referring to FIG. 1B, the electronic device 1000 may be folded with respect to a first folding axis FX1. The first folding axis FX1 may be an imaginary axis extending in the first direction DR1. In this case, the first folding axis FX1 may be parallel to a long side of the electronic device 1000. The first folding axis FX1 may extend along the first direction DR1 on the first display surface FS. In another example, the first folding axis FX1 may be parallel to a short side of the electronic device 1000 and may extend along the second direction DR2 on the first display surface FS.

The non-folding regions NFA1 and NFA2 may be spaced apart from each other with respect to the folding region FA1 interposed therebetween and may be disposed adjacent to the folding region FA1. For example, a first non-folding region NFA1 may be disposed on one side of the folding region FA1 along the second direction DR2, and a second non-folding region NFA2 may be disposed on the other side of the folding region FA1 along the opposite direction of the second direction DR2.

The electronic device 1000 may be folded with respect to the first folding axis FX1 and deformed to an in-folded state in which one region, of the first display surface FS, overlapping the first non-folding region NFA1 and the other region overlapping the second non-folding region NFA2 face each other.

Figure 1C:
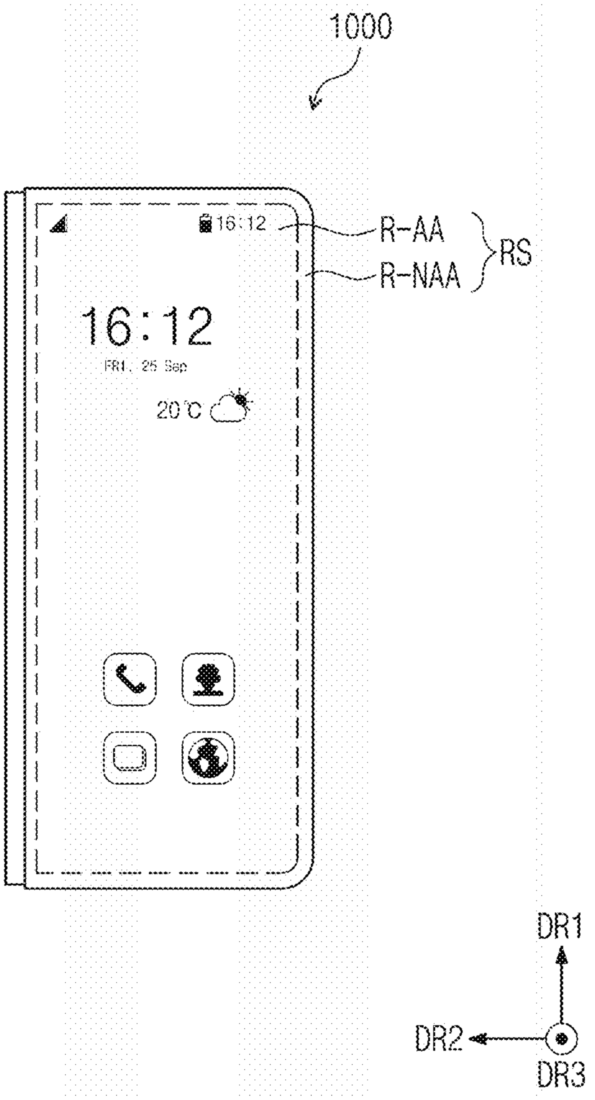
FIG. 1C is a plan view illustrating an in-folded state of the electronic device illustrated in FIG. 1A.

FIG. 1C is a plan view illustrating an in-folded state of the electronic device illustrated in FIG. 1A.

Referring to FIG. 1C, the second display surface RS may be viewed by a user when the electronic device 1000 is in-folded. In this case, the second display surface RS may include a second active region R-AA which displays an image, and a second peripheral region R-NAA which is adjacent to the second active region R-AA which may not display an image. The second active region R-AA may be a region which may display an image and sense various forms of external inputs. The second peripheral region R-NAA may have a predetermined color and may not display an image. In this case, the second peripheral region R-NAA may surround the second active region R-AA. In addition, a shape of the second active region R-AA may be defined substantially by the second peripheral region R-NAA. However, this is an example, and the second peripheral region R-NAA may be disposed adjacent to only one side of the second active region R-AA, or may be omitted. In addition, although not illustrated herein, the second display surface RS may further include an electronic module region in which an electronic module having various components is disposed, but is not limited to any one embodiment.

Figure 1D:
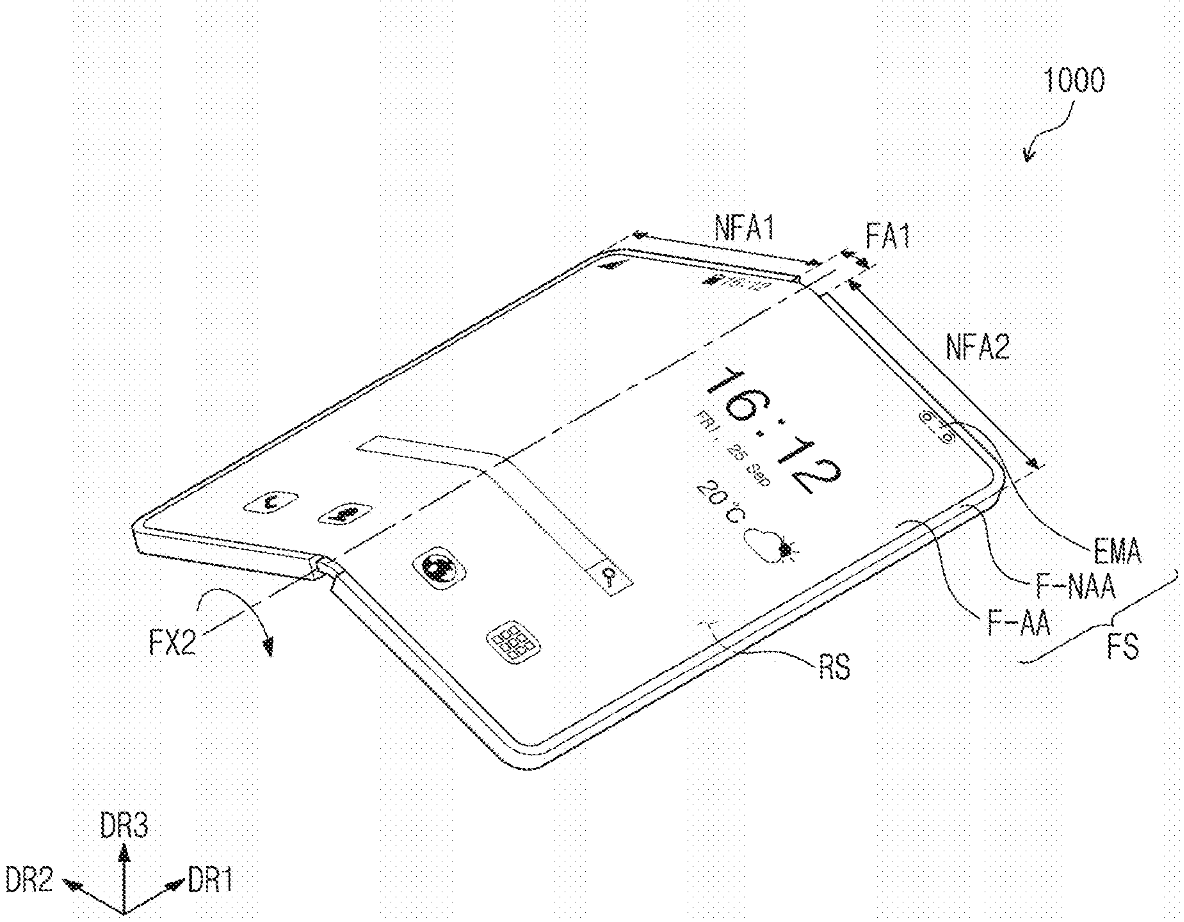
FIG. 1D is a perspective view illustrating an out-folding process of an electronic device according to an embodiment of the present disclosure.

FIG. 1D is a perspective view illustrating an out-folding process of an electronic device according to an embodiment of the present disclosure.

Referring to FIG. 1D, the electronic device 1000 may be folded with respect to a second folding axis FX2 and deformed to an out-folded state in which one region, of the second display surface RS, overlapping the first non-folding region NFA1 and the other region overlapping the second non-folding region NFA2 face each other.

However, an embodiment of the present disclosure is not limited thereto, and the electronic device may be folded with respect to a plurality of folding axes such that a portion of the first display surface FS and a portion of the second display surface RS may face each other. The number of folding axes and the number of non-folding regions corresponding thereto are not particularly limited.

The electronic device 1000 according to an embodiment of the present disclosure may be configured to perform an in-folding operation or an out-folding operation repetitively, but an embodiment of the present disclosure is not limited thereto. In an embodiment, the electronic device 1000 may be configured to select any one among unfolding, in-folding, and out-folding operations.

Figure 2:
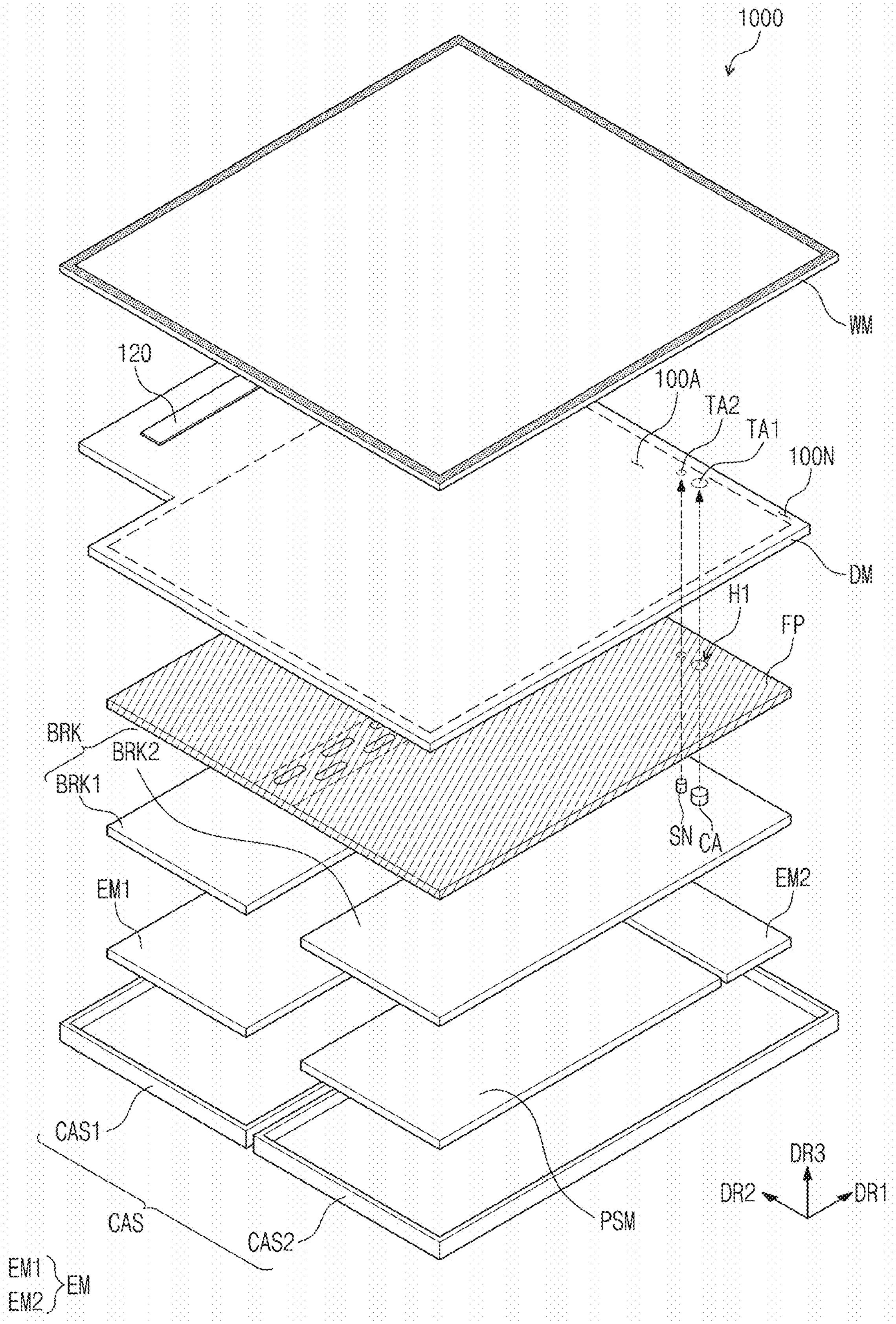
FIG. 2 is an exploded view of an electronic device according to an embodiment of the present disclosure.

FIG. 2 is an exploded view of an electronic device according to an embodiment of the present disclosure.

As referring to FIG. 2, the electronic device 1000 includes a window WM, a display module DM, a supporting part FP, a camera CA, a sensor SN, a bracket BRK, an electronic module EM, a power supply module PSM, and a case CAS.

The window WM may be disposed on a front surface of the electronic device 1000. The window WM may transmit an image generated in the display module DM and provide the image to a user.

In the display module DM of the electronic device 1000, an active region 100A may correspond to the first active region F-AA (see FIG. 1A), and a peripheral region 100N may correspond to the first peripheral region F-NAA (see FIG. 1A). In this specification, the wording "a region/portion corresponds to a region/portion" means the regions/portions overlapping and is not limited to the regions/portions having the same area.

A first transmission region TA1 and a second transmission region TA2 may overlap the electronic module region EMA (see FIG. 1A) of the electronic device 1000 in the display module DM along the third direction DR3. The first transmission region TA1 and the second transmission region TA2 may have a higher light transmittance than peripheral regions disposed around the first and the second transmittance regions. The camera CA may be disposed under the first transmission region TA1, and the sensor SN may be disposed under the second transmission region TA2 along the third direction DR3. Light transmitted through the first transmission region TA1 and the second transmission region TA2 may be provided to the camera CA and the sensor SN, respectively.

The display module DM may include a data driving circuit 120 (shown in FIG. 4) disposed along the peripheral region 100N. The data driving circuit 120 may be manufactured in a form of an integrated circuit chip and mounted on the peripheral region 100N. However, an embodiment of the present disclosure is not limited thereto, and the data driving circuit 120 may be mounted on a flexible printed circuit board which is connected to the display module DM.

The supporting part FP may be disposed under the display module DM. In this case, the supporting part FP may be disposed between each of the first transmission region TA1 and the second transmission region TA2 and each of the camera CA and the sensor SN. The supporting part FP may support the display module DM. A plurality of openings H1 may be defined in the supporting part FP. The plurality of openings H1 may pass through the supporting part FP in the third direction DR3. When viewed on a plane, each of the plurality of openings H1 may overlap the first transmission region TA1 and the second transmission region TA2 along the third direction DR3. The camera CA and the sensor SN may be disposed under the plurality of openings H1 along the third direction DR3. Thus, in the case, each of the first transmission region TA1 and the second transmission region TA2 may be connected to each of the camera CA and the sensor SN through the plurality of openings H1 along the third direction DR3.

The bracket BRK may be disposed under the supporting part FP. The bracket BRK may include a first bracket BRK1 and a second bracket BRK2. The first bracket BRK1 and the second bracket BRK2 may extend in the first direction DR1 and may be arranged with respect to each other in the second direction DR2. The bracket BRK according to an embodiment of the present disclosure may be attached to the supporting part FP.

The electronic module EM and the power supply module PSM may be disposed under the first and second brackets BRK1 and BRK2. The electronic module EM may include a first electronic module EM1 and a second electronic module EM2. Although not illustrated herein, the electronic module EM and the power supply module PSM may be connected to each other through a separate flexible printed circuit board. The electronic module EM may control an operation of the display module DM. The power supply module PSM may supply power to the electronic module EM. In this case, the power supply module PSM may be disposed directly below the second bracket BRK2. However, in another example, the location of the power supply module PSM may be different.

The case CAS may accommodate the display module DM, the supporting part FP, the bracket BRK, the electronic module EM, and the power supply module PSM. The case CAS may include two separate cases which are a first case CAS1 and a second case CAS2 to fold the display module DM. The first and second cases CAS1 and CAS2 may extend in the first direction DR1 and may be arranged with respect to each other in the second direction DR2.

Although not illustrated herein, the electronic device 1000 may further include a hinge structure for connecting the first and second cases CAS1 and CAS2 along the first direction DR1, and allowing the first and second cases CAS1 and CAS2 to be pivoted so that the first and second cases CAS1 and CAS2 are in-folded together. The case CAS may protect the display module DM, the supporting part FP, the bracket BRK, the electronic module EM, and the power supply module PSM.

Figure 3:
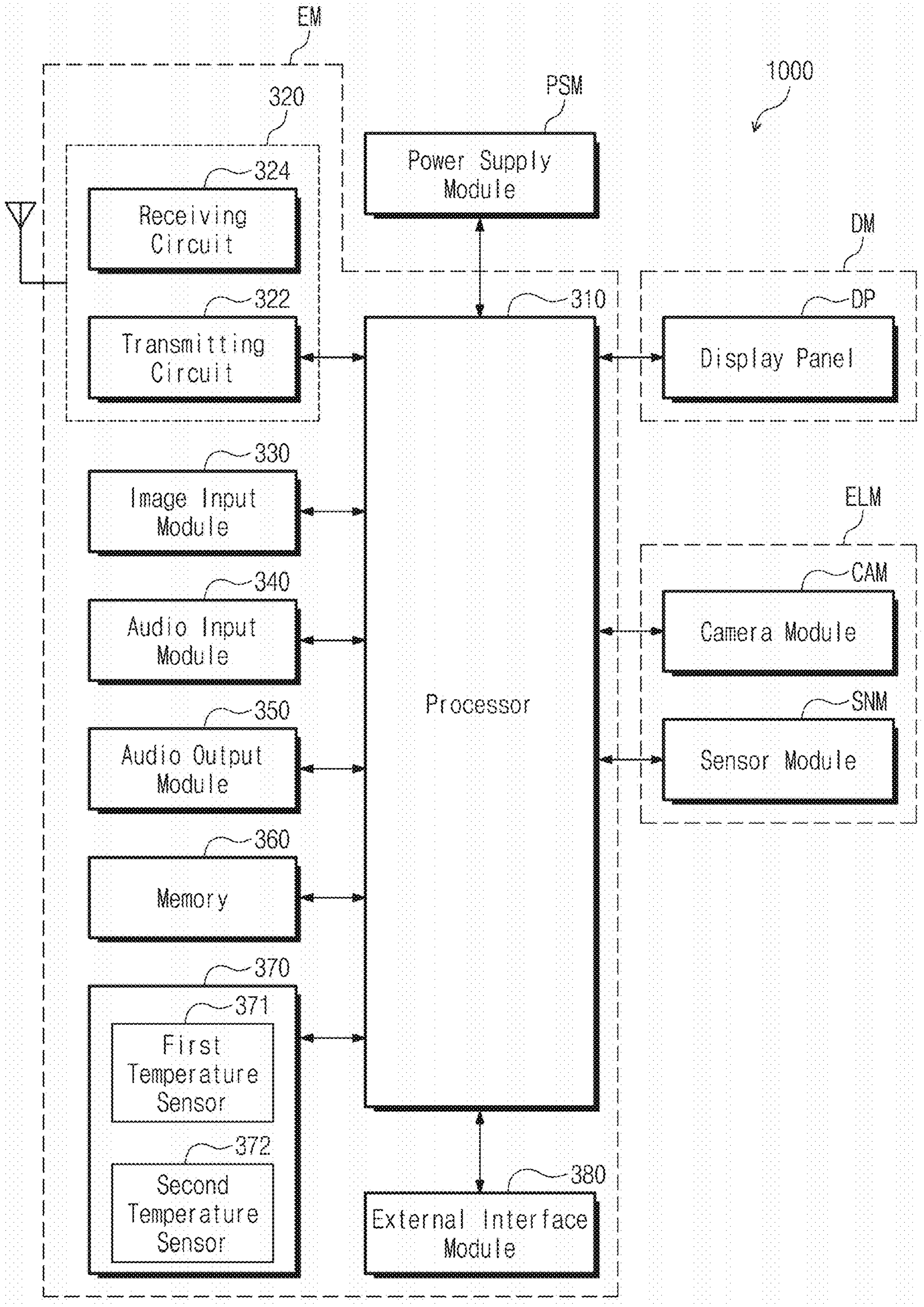
FIG. 3 is a block diagram of an electronic device according to an embodiment of the present disclosure.

FIG. 3 is a block diagram of an electronic device according to an embodiment of the present disclosure.

Referring to FIGS. 2 and 3, the electronic device 1000 may include an electronic module EM, a power supply module PSM, a display module DM, and an electro-optical module ELM.

The display module DM may include a display panel DP. The display panel DP may be a light-emitting display panel. For example, the display panel DP may be an organic light-emitting display panel, a quantum dot display panel, a micro-LED display panel, or a nano LED display panel. A light-emitting layer of the organic light-emitting display panel may include an organic light-emitting material. A light-emitting layer of the quantum dot display panel may include quantum dots, quantum rods, etc. A light-emitting layer of the micro-LED display panel may include a micro-LED. A light-emitting layer of the nano LED display panel may include a nano-LED.

The electronic module EM may include a processor 310, a wireless communication module 320 which may include a receiving circuit 324 and a transmitting circuit 322, an image input module 330, an audio input module 340, an audio output module 350, a memory 360, a temperature sensor 370 which may include a first temperature sensor 371 and a second temperature sensor 372, an external interface module 380, and the like. The modules may be mounted on a circuit board, or may be electrically connected through a flexible circuit board. The electronic module EM may be electrically connected to the power supply module PSM.

The electronic module EM may be disposed under the display module DM. The processor 310 may be disposed under the display panel DP. The processor 310 may be included in the second electronic module EM2. For example, when viewed on a plane, the processor 310 may overlap the second non-folding region NFA2 (see FIG. 1A). In another example, the processor 310 may be included in the first electronic module EM1. For example, when viewed on a plane, the processor 310 may overlap the first non-folding region NFA1 (see FIG. 1A).

The processor 310 may control an overall operation of the electronic device 1000. For example, the processor 310 may activate or inactivate the display module DM in accordance with a user's input. The processor 310 may control, in accordance with a user's input, the image input module 330, the audio input module 340, the audio output module 350, the temperature sensor 370, and the like. The processor 310 may include at least one microprocessor.

The wireless communication module 320 may transmit/receive a wireless signal to/from another terminal using a Bluetooth or a Wi-Fi line. However, it is not limited thereto. The wireless communication module 320 may transmit/receive an audio signal using a general communication line. The wireless communication module 320 may include the transmitting circuit 322 which modulates and transmits a signal to be transmitted and the receiving circuit 324 which demodulates a received signal.

The image input module 330 may process an image signal and convert the image signal into displayable image data in the display module DM. The audio input module 340 may receive an external audio signal which may be input by a microphone in a recording mode, a voice recognition mode, or the like and may convert the external audio signal into electrical audio data. The audio output module 350 may convert and output audio data which is received from the wireless communication module 320 or which is stored in the memory 360.

The temperature sensor 370 may include the first temperature sensor 371 and the second temperature sensor 372. The first temperature sensor 371 may be included in the first electronic module EM1, and the second temperature sensor 372 may be included in the second electronic module EM2. However, in another example, the first temperature sensor 371 may be included in the second electronic module EM2, and the second temperature sensor 372 may be included in the first electronic module EM1. The temperature sensor 370 may be disposed under the display panel DP. The first temperature sensor 371 may be disposed under one portion of the display panel DP. The second temperature sensor 372 may be disposed under the other portion of the display panel DP. For example, when viewed on a plane, the first temperature sensor 371 may overlap the first non-folding region NFA1, and the second temperature sensor 372 may overlap the second non-folding region NFA2 (see FIG. 1A). In this case, the processor 310 may also be disposed under one or the other portion of the display panel DP.

The external interface module 380 may serve as an interface connected to an external charger, a wired/wireless data port, a card socket (for example, a memory card, a SIM/UIM card), etc.

The power supply module PSM may supply power required to an overall operation of the electronic device 1000. In an example, the power supply module PSM may include a typical battery device.

The electro-optical module ELM may be an electronic component which transmits or receives a light signal. The electro-optical module ELM may be disposed under the display module DM. The electro-optical module ELM may transmit or receive a light signal through at least one opening of the display module DM. In the present embodiment, the electro-optical module ELM may include a camera module CAM and a sensor module SNM. The camera module CAM may include a camera CA. The sensor module SNM may include a sensor SN.

Figure 4:
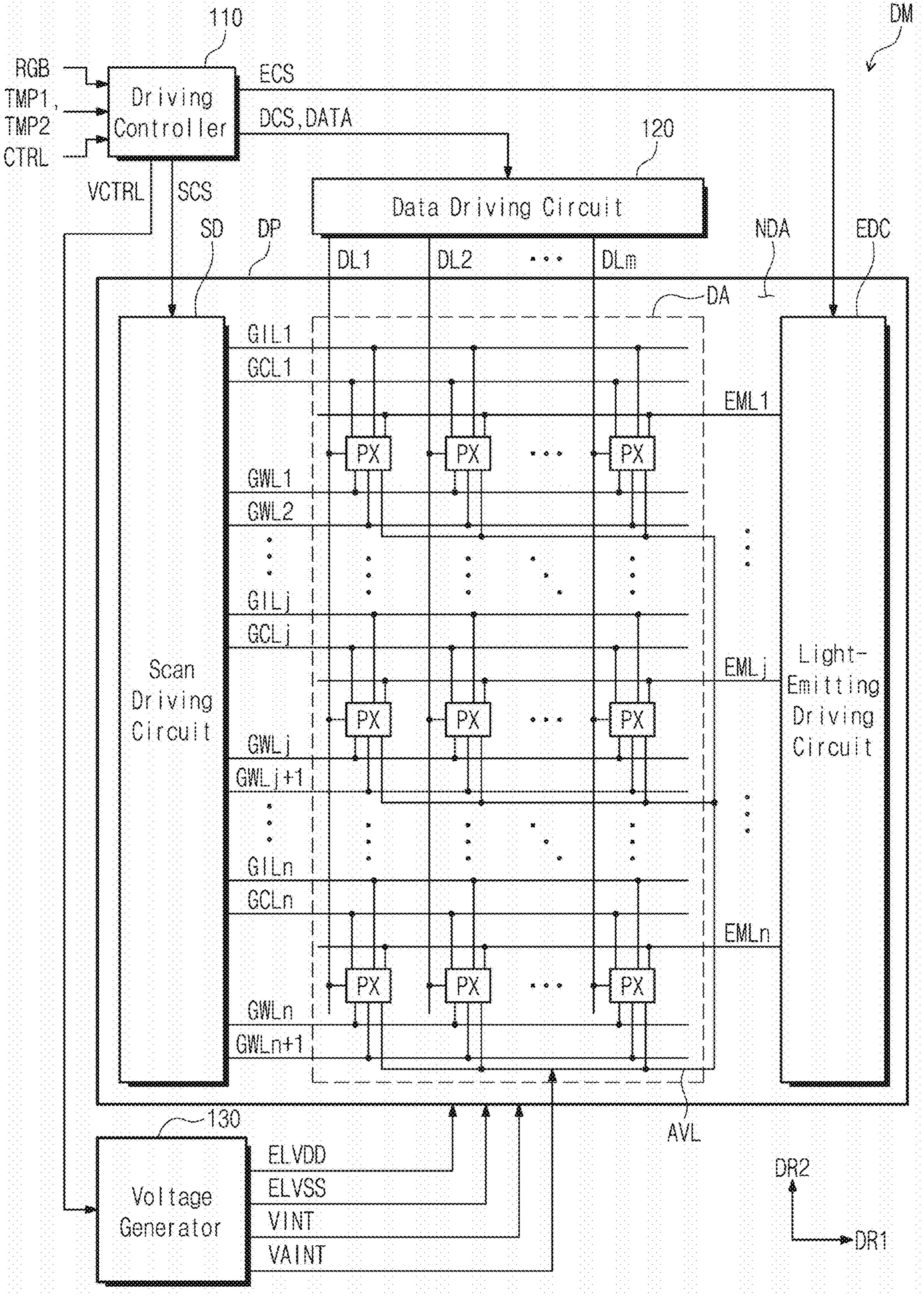
FIG. 4 is a block diagram of a display module according to an embodiment of the present disclosure.

FIG. 4 is a block diagram of a display module according to an embodiment of the present disclosure.

Referring to FIGS. 3 and 4, the display module DM may include the display panel DP, a driving controller 110, a data driving circuit 120, and a voltage generator 130.

The driving controller 110 may be driven by the processor 310, and may receive an image signal RGB and a control signal CTRL from the processor 310.

The first temperature sensor 371 may measure a first temperature TMP1 of a first portion of the display panel DP and transmit the first temperature TMP1 to the driving controller 110. The second temperature sensor 372 may measure a second temperature TMP2 of a second portion of the display panel DP and transmit the second temperature TMP2 to the driving controller 110. For example, the driving controller 110 may receive the first temperature TMP1 from the first temperature sensor 371, and the second temperature TMP2 from the second temperature sensor 372. In this case, the driving controller 110 may receive the image signal RGB and the control signal CTRL from the processor 310 and the first and second temperatures TMP1 and TMP2 from the first temperature sensor 371 and the second temperature sensor 372.

As depicted in FIG. 4, the driving controller 110 converts a data format of the image signal RGB to comply with specifications of interface with the data driving circuit 120 and generates an output image signal DATA. In addition, the driving controller 110 further generates outputs of a scan control signal SCS, a data control signal DCS, and a light-emitting driving signal ECS.

Referring to FIG. 4, the data driving circuit 120 receives the data control signal DCS and the output image signal DATA from the driving controller 110. The data driving circuit 120 converts the output image signal DATA into data signals, and outputs the data signals to a plurality of data lines DL1 to DLm to be described later. The data signals are analog voltages corresponding to a grayscale value of the output image signal DATA.

Still depicted in FIG. 4, the display panel DP includes scan lines GIL1 to GILn, GCL1 to GCLn, and GWL1 to GWLn+1, light-emitting control lines EML1 to EMLn, data lines DL1 to DLm, and pixels PX. The display panel DP may further include a scan driving circuit SD and a light-emitting driving circuit EDC which are disposed along the second direction DR2. The display panel DP includes a display region DA corresponding to the active region 100A (see FIG. 2) and a non-display region NDA corresponding to the peripheral region 100N (see FIG. 2) which surrounds the active region 100A. A plurality of pixels PX are disposed in the display region DA. The scan driving circuit SD and the light-emitting driving circuit EDC may be disposed in the non-display region NDA.

In an embodiment, the scan driving circuit SD is arranged on a first side of the display panel DP. The scan lines GIL1 to GILn, GCL1 to GCLn, and GWL1 to GWLn+1 extend in the first direction DR1 from the scan driving circuit SD, and each of the scan lines are spaced apart from each other along the second direction DR2.

The light-emitting driving circuit EDC is arranged on a second side of display panel DP which is disposed opposite to the scan driving circuit SD. The light-emitting control lines EML1 to EMLn extend in the opposite direction of the first direction DR1 from the light-emitting driving circuit EDC.

The scan lines GIL1 to GILn, GCL1 to GCLn, and GWL1 to GWLn+1 and the light-emitting control lines EML1 to EMLn arranged to be spaced apart from each other in the second direction DR2 and are parallel to each other along the first direction DR1. The data lines DL1 to DLm extend in the opposite direction of the second direction DR2 from the data driving circuit 120, and are arranged to be spaced apart from each other in the first direction DR1.

In an example illustrated in FIG. 4, the scan driving circuit SD and the light-emitting driving circuit EDC are arranged facing each other with respect to the pixels PX interposed therebetween, but an embodiment of the present disclosure is not limited thereto. For example, the scan driving circuit SD and the light-emitting driving circuit EDC may be disposed adjacent to each other on either of the first side or the second side of the display panel DP. In another example, the light-emitting driving circuit EDC may be disposed opposite to the data driving circuit 120. In an embodiment, the scan driving circuit SD and the light-emitting driving circuit EDC may be composed of one circuit.

As depicted in FIG. 4, the plurality of pixels PX are electrically connected to the scan lines GIL1 to GILn, GCL1 to GCLn, and GWL1 to GWLn+1, the light-emitting control lines EML1 to EMLn, and the data lines DL1 to DLm, respectively. The plurality of pixels PX may be electrically connected to at least four scan lines and one light-emitting control line, respectively. In addition, each of the plurality of pixels PX is electrically connected to at least one data line. For example, as illustrated in FIG. 4, pixels in a first row are connected to the scan lines GIL1, GCL1, GWL1, and GWL2 and the light-emitting control line EML1. In addition, each of the pixels in the first low is connected to at least one of the data lines DL1, DL2, . . . DLm. In addition, pixels in a j-th row are connected to the scan lines GILj, GCLj, GWLj, and GWLj+1 and the light-emitting control line EMLj.

Each of the plurality of pixels PX receives, from the voltage generator 130, a driving voltage ELVDD, a power supply voltage ELVSS, an initialization voltage VINT, and an anode initialization voltage VAINT.

The scan driving circuit SD receives the scan control signal SCS from the driving controller 110. The scan driving circuit SD outputs scan signals to the scan lines GIL1 to GILn, GCL1 to GCLn, and GWL1 to GWLn+1 in response to the scan control signal SCS. A circuit configuration and operation of the scan driving circuit SD will be described in detail later.

The voltage generator 130 generates voltages required for an operation of the display panel DP. In this embodiment, the voltage generator 130 generates a driving voltage ELVDD, a power supply voltage ELVSS, an initialization voltage VINT, and an anode initialization voltage VAINT in response to a voltage control signal VCTRL from the driving controller 110. An initialization voltage line AVL may transmit the anode initialization voltage VAINT to each of the plurality of pixels PX.

The driving controller 110 according to an embodiment of the present disclosure may output the voltage control signal VCTRL to the voltage generator 130 based on the first temperature TMP1 and the second temperature TMP2. The driving controller 110 may control an operation of the voltage generator 130 through the voltage control signal VCTRL. In an embodiment, the voltage generator 130 may change a voltage level of the anode initialization voltage VAINT in response to the voltage control signal VCTRL.

In this case, the voltage generator 130 operates in response to the voltage control signal VCTRL provided from the driving controller 110, but an embodiment of the present disclosure is not limited thereto. For example, the voltage generator 130 may operate in response to a voltage control signal provided from various hosting devices such as an application processor, a graphic processor, a CPU, or the like.

Figure 5:
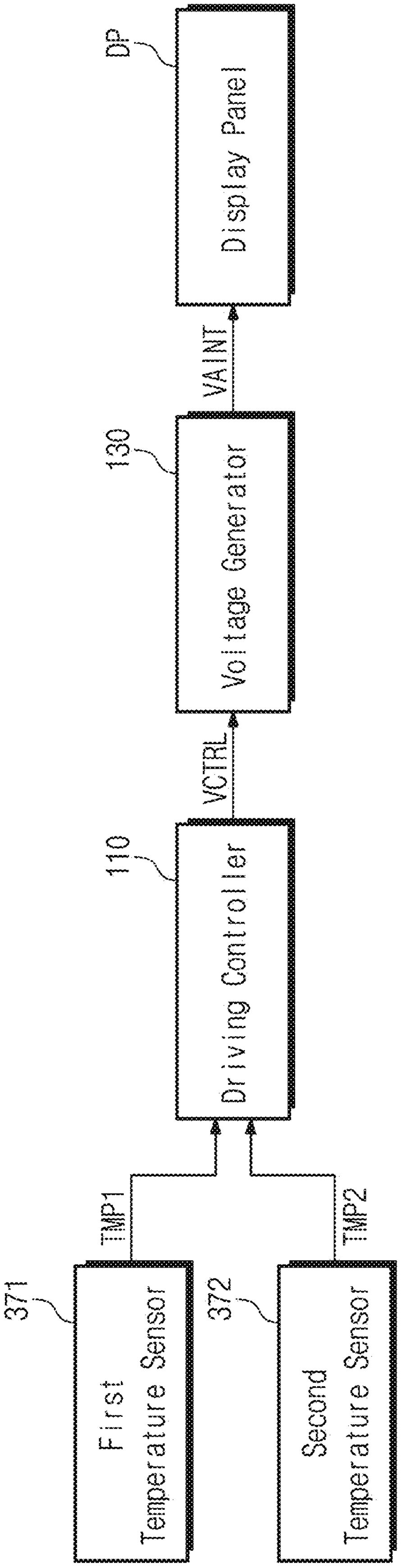
FIG. 5 is a block diagram illustrating that an anode initialization voltage controls a display panel according to an embodiment of the present disclosure.
Figure 6:
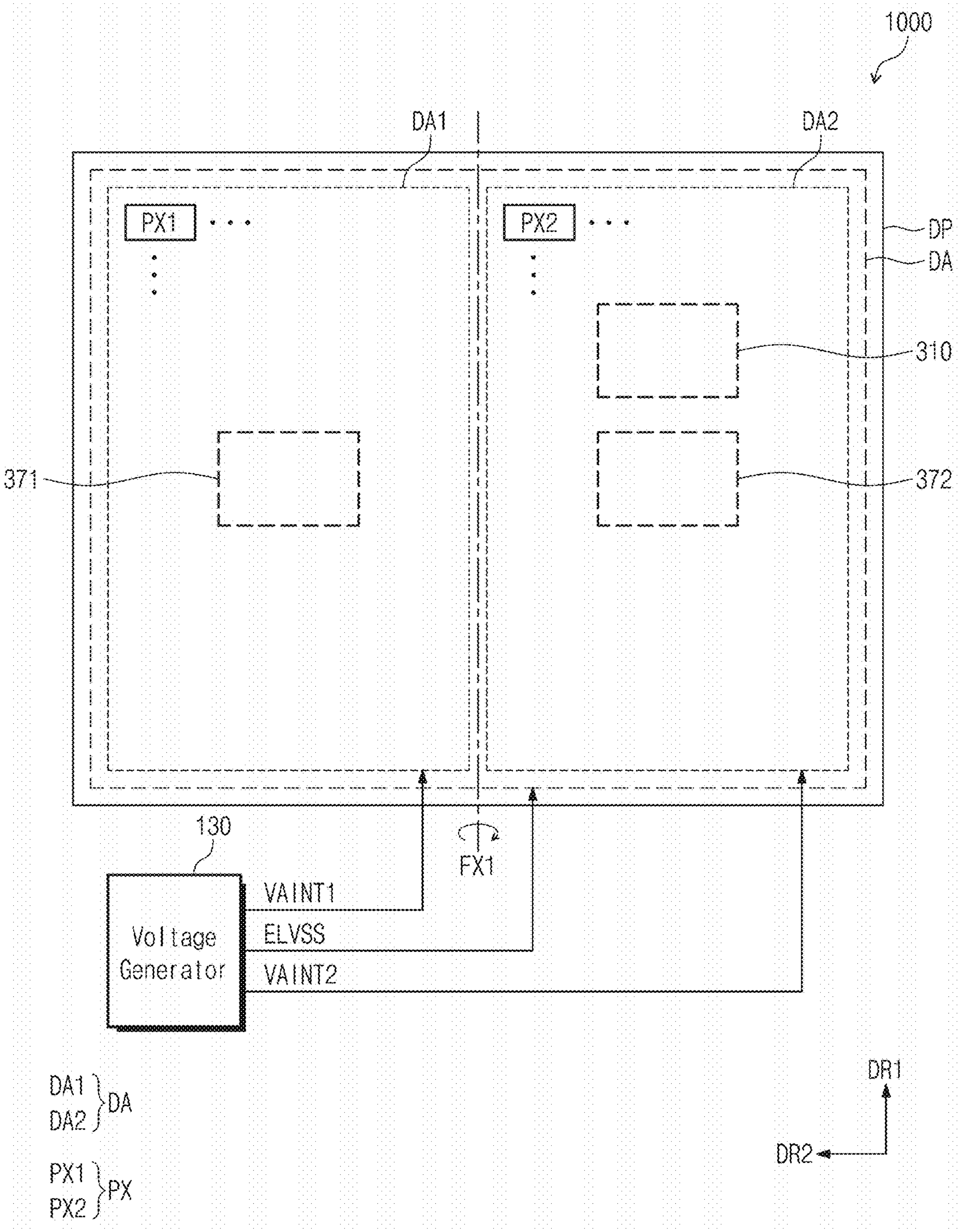
FIG. 6 is a block diagram illustrating a display panel and a voltage generator according to an embodiment of the present disclosure.

FIG. 5 is a block diagram illustrating that an anode initialization voltage controls a display panel according to an embodiment of the present disclosure. FIG. 6 is a block diagram illustrating a display panel and a voltage generator according to an embodiment of the present disclosure.

Referring to FIGS. 4 to 6, since the electronic device 1000 is folded with respect to a first folding axis FX1, the display panel DP included in the electronic device 1000 may also be folded with respect to the first folding axis FX1. The first folding axis FX1 may be in parallel with the first direction DR1 crossing the second direction DR2.

A display region DA may be defined in the display panel DP. The display region DA may include a first display region DA1 and a second display region DA2 spaced apart from the first display region DA1 in the opposite direction of the second direction DR2. In this case, the first display region DA1 and the second display region DA2 may be divided along the first folding axis FX1. For example, the first folding axis FX1 may be defined between the first display region DA1 and the second display region DA2.

When viewed on a plane, the first display region DA1 may overlap the first non-folding region NFA1 and one portion of the folding region FA1 (sec FIG. 1A). The second display region DA2 may overlap the second non-folding region NFA2 and the other portion of the folding region FA1 (see FIG. 1A). In this case, the first display region DA1 may correspond to the first non-folding region NFA1 and the left portion of the folding region FA1 with respect to the first folding axis FX1, and the second display region DA2 may correspond to the second on-folding region NFA2 and the right portion of the folding region FA1 with respect to the first folding axis FX1.

The plurality of pixels PX may include a first pixel PX1 and a second pixel PX2. The first pixel PX1 may be disposed in the first display region DA1, and the second pixel PX2 may be disposed in the second display region DA2. For example, each of the plurality of pixels, among the plurality of pixels PX, disposed in the first display region DA1 may be defined as the first pixel PX1, and each of the plurality of pixels, among the plurality of pixels PX, disposed in the second display region DA2 may be defined as the second pixel PX2.

The first temperature sensor 371 may be disposed under the first display region DA1. The first temperature sensor 371 may measure a temperature of the first display region DA1. The temperature of the first display region DA1 may be defined as a first temperature TMP1. The first temperature sensor 371 may transmit the first temperature TMP1 to the driving controller 110.

The second temperature sensor 372 may be disposed under the second display region DA2. The second temperature sensor 372 may measure a temperature of the second display region DA2. The temperature of the second display region DA2 may be defined as a second temperature TMP2. The second temperature sensor 372 may transmit the second temperature TMP2 to the driving controller 110.

The driving controller 110 may receive the first temperature TMP1 and the second temperature TMP2, and may generate the voltage control signal VCTRL based on the first and second temperatures TMP1 and TMP2. The driving controller 110 may output the voltage control signal VCTRL to the voltage generator 130.

The voltage generator 130 may provide, on the basis of the voltage control signal VCTRL, the anode initialization voltage VAINT to the display panel DP through the initialization voltage line AVL. The anode initialization voltage VAINT may include a first initialization voltage VAINT1 and a second initialization voltage VAINT2. The initialization voltage line AVL may include a first initialization voltage line AVL1 (see FIG. 7) and a second initialization voltage line AVL2 (see FIG. 8). The voltage generator 130 may provide the first initialization voltage VAINT1 to the first pixel PX1 through the first initialization voltage line AVL1 (sec FIG. 7) and may provide the second initialization voltage VAINT2 to the second pixel PX2 through the second initialization voltage line AVL2 (see FIG. 8). In this case, the first initialization voltage VAINT1 and the second initialization voltage VAINT2 may have different voltage levels each other.

The processor 310 may be disposed under the second display region DA2. Heat may be generated while the processor 310 controls the electronic device 1000. Accordingly, the first temperature TMP1 may be different from the second temperature TMP2. As depicted in FIG. 6, the processor 310 is disposed under the second display region DA2, and thus the second temperature TMP2 may be higher than the first temperature TMP1 due to the heat generated by the processor 130. The voltage generator 130 may provide, to the first pixel PX1, the first initialization voltage VAINT1 having an absolute value less than that of the power supply voltage ELVSS and may provide, to the second pixel PX2, the second initialization voltage VAINT2 having an absolute value greater than that of the power supply voltage ELVSS. For example, the power supply voltage ELVSS may be about −2.0 volt (V), the first initialization voltage VAINT1 may be about −1.9 V, and the second initialization voltage VAINT2 may be about −2.1 V. For example, when the first temperature TMP1 is lower than the second temperature TMP2, the absolute value of the first initialization voltage VAINT1 may be less than the absolute value of the second initialization voltage VAINT2.

According to the present disclosure, the voltage generator 130 may provide the first initialization voltage VAINT1 to the first display region DA1 on the basis of the first temperature TMP1 and provide the second initialization voltage VAINT2 to the second display region DA2 on the basis of the second temperature TMP2. As the voltage generator 130 differently controls the anode initialization voltage VAINT depending on the temperature of the display panel DP, a luminance difference between the first display region DA1 and the second display region DA2 may be improved. Accordingly, the electronic device 1000 with improved display quality may be provided by the improved heat control of the display panel DP.

Figure 7:
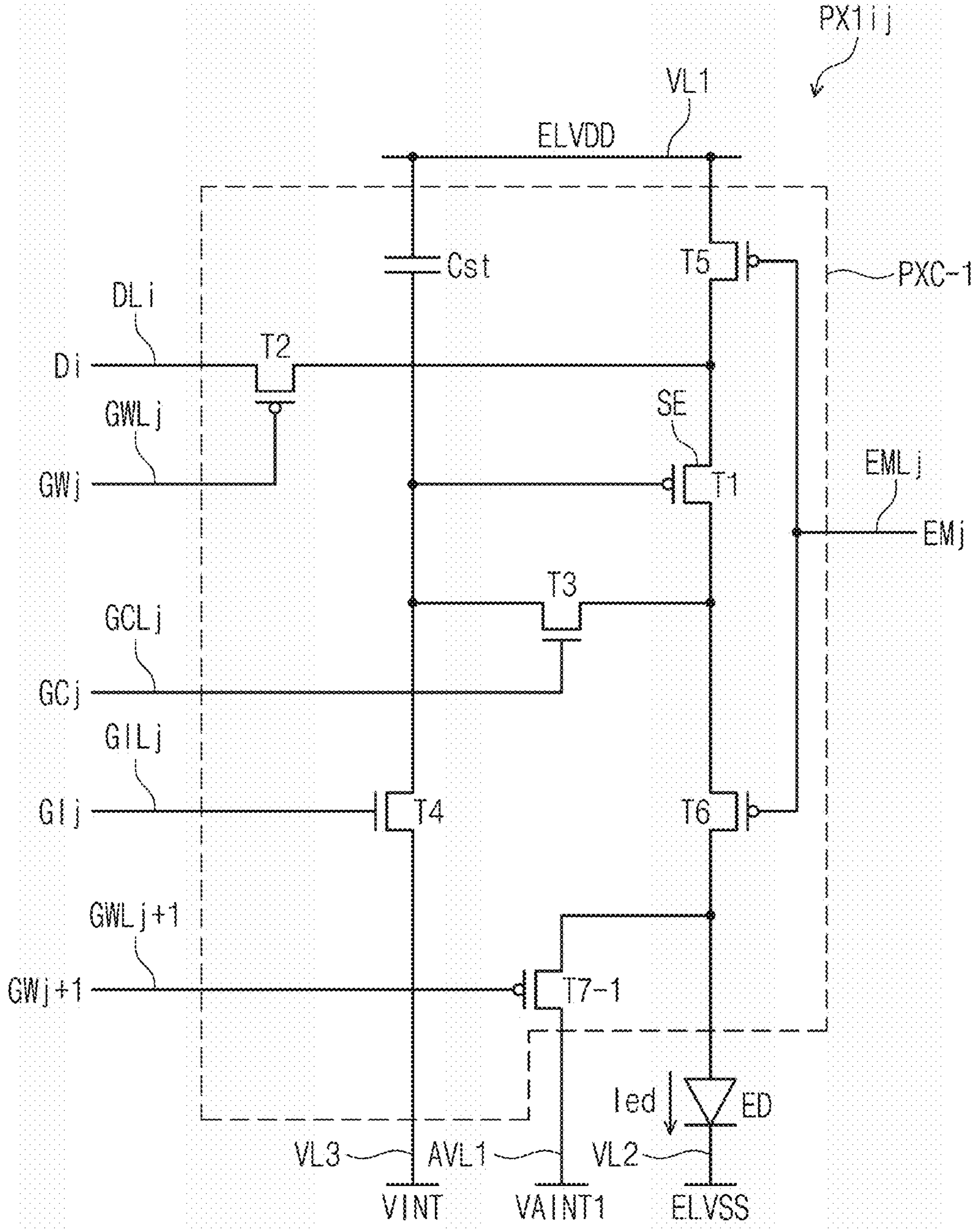
FIG. 7 is an equivalent circuit diagram of a first pixel according to an embodiment of the present disclosure.

FIG. 7 is an equivalent circuit diagram of a first pixel according to an embodiment of the present disclosure.

FIG. 7 illustrates an equivalent circuit diagram of a first pixel PX1*ij* illustrated in FIG. 6 among pixels PXij connected to an i-th data line DLi among the data lines DL1 to DLm, j-th scan lines GILj, GCLj, and GWLj, and a (j+1)-th scan line GWLj+1 among the scan lines GIL1 to GILn, GCL1 to GCLn, GWL1 to GWLn+1, and a j-th light-emitting control line EMLj among the light-emitting control lines EML1 to EMLn, illustrated in FIG. 4

The first pixel PX1 illustrated in FIG. 6 may have the same circuit configuration as that of the equivalent circuit diagram of the first pixel PX1*ij* illustrated in FIG. 7.

As referring to FIGS. 6 and 7, the first pixel PX1*ij* includes a first pixel circuit PXC-1 and at least one light-emitting element ED. The first pixel circuit PXC-1 may control light emission of the light-emitting element ED, and the light-emitting element ED may emit a light.

The first pixel circuit PXC-1 includes first to seventh transistors T1, T2, T3, T4, T5, T6, and T7-1 and a capacitor Cst. In another example, the first pixel PXC-1 may include less or more than seven transistors and more than one capacitor. In an embodiment, the light-emitting element ED may be a light emitting diode. In this embodiment, the first pixel PX1*ij* includes one light-emitting element ED.

The third and fourth transistors T3 and T4 among the first to seventh transistors T1 to T7-1 may be N-type transistors having an oxide semiconductor as a semiconductor layer. Each of the first, second, fifth, sixth, and seventh transistors T1, T2, T5, T6, and T7-1 may be a P-type transistor having a low-temperature polycrystalline silicon (LTPS) semiconductor layer. However, in another embodiment of the present disclosure, all of the first to seventh transistors T1 to T7-1 may be P-type transistors or N-type transistors. In another embodiment, at least one of the first to seventh transistors T1 to T7-1 may be an N-type transistor, and the others may be P-type transistors. In addition, a circuit configuration of the pixel according to the present disclosure is not limited to FIG. 7. The first pixel circuit PXC-1 illustrated in FIG. 7 is just an example and the configuration of the first pixel circuit PXC-1 may be variously implemented.

The scan lines GILj, GCLj, GWLj, and GWLj+1 may transmit scan signals GIj, GCj, GWj, and GWj+1 respectively, and the light-emitting control line EMLj may transmit a light-emitting control signal EMj. The data line DLi may transmit a data signal Di. The data signal Di may have a voltage level corresponding to the image signal RGB (see FIG. 4) which is input to the display module DM (see FIG. 4). The first voltage line VL1 may transmit a driving voltage ELVDD, the second voltage line VL2 may transmit a driving voltage ELVDD, and the third voltage line VL3 may transmit an initialization voltage VINT. The first initialization voltage line AVL1 may transmit the first initialization voltage VAINT1.

As depicted in FIG. 7, the first transistor T1 includes a first electrode SE, a second electrode, and a gate electrode. The first electrode SE of the first transistor T1 is connected to the first voltage line VL1 via the fifth transistor T5, the second electrode of the first transistor T1 is electrically connected to an anode of the light-emitting element ED via the sixth transistor T6, and the gate electrode of the first transistor T1 is connected to one end of a capacitor Cst and the transistor T3. The first transistor T1 may receive the data signal Di transmitted by the data line DLi according to a switching operation of the second transistor T2 and may provide a driving current led to the light-emitting element ED.

The second transistor T2 includes a first electrode, a second electrode, and a gate electrode. The first electrode of the second transistor T2 is connected to the data line DLi, the second electrode of the second transistor T2 is connected to the first electrode SE of the first transistor T1 and the fifth transistor T5, and the gate electrode of the second transistor T2 is connected to the scan line GWLj. The second transistor T2 may be turned on in response to the scan signal GWj transmitted through the scan line GWLj and may transmit the data signal Di, which is transmitted from the data line DLi, to the first transistor T1.

The third transistor T3 includes a first electrode, a second electrode, and a gate electrode. The first electrode of the third transistor T3 is connected to the gate electrode of the first transistor T1 and the fourth transistor T4, the second electrode is connected to the second electrode of the first transistor T1 and the sixth transistor T6, and the gate electrode is connected to the scan line GCLj. The third transistor T3 may be turned on in response to the scan signal GCj transmitted through the scan line GCLj and may connect the first transistor T1 to a diode by connecting the gate electrode of the first transistor T1 and the second electrode to each other.

The fourth transistor T4 includes a first electrode, a second electrode, and a gate electrode. The first electrode of the fourth transistor T4 is connected to the gate electrode of the first transistor T1 and the capacitor Cst, the second electrode is connected to the third voltage line VL3 to which the initialization voltage VINT is transmitted, and the gate electrode is connected to the scan line GILj. The fourth transistor T4 may be turned on in response to the scan signal Gij transmitted through the scan line GILj and may transmit the initialization voltage VINT to the gate electrode of the first transistor T1 to perform an initialization operation for initializing the voltage of the gate electrode of the first transistor T1.

The fifth transistor T5 includes a first electrode which is connected to the first voltage line VL1, a second electrode which is connected to the first electrode SE of the first transistor T1 and the second transistor T2, and a gate electrode which is connected to the light-emitting control line EMLj.

The sixth transistor T6 includes a first electrode which is connected to the second electrode of the first transistor T1 and the third transistor T3, a second electrode which is connected to the anode of the light-emitting element ED and the seventh transistor T7-1, and a gate electrode which is connected to the light-emitting control line EMLj.

The fifth transistor T5 and the sixth transistor T6 may be turned at the same time in response to the light-emitting control signal EMj transmitted through the light-emitting control line EMLj, and thereby the driving voltage ELVDD may be compensated by the first transistor T1 connected to the diode and may be transmitted to the light-emitting element ED The seventh transistor T7-1 includes a first electrode which is connected to the anode of the light-emitting element ED and the sixth transistor T6, a second electrode which is connected to the first initialization voltage line AVL1, and a gate electrode which is connected to the scan line GWLj+1. The seventh transistor T7-1 may be turned on in response to the scan signal GWj+1 transmitted through the scan line GWLj+1 and may bypass a current of the anode of the light-emitting element ED through the first initialization voltage line AVL1.

One end of the capacitor Cst, as described above, is connected to the gate electrode of the first transistor T1, and the other end of the capacitor Cst is connected to the first voltage line VL1 for transmitting the driving voltage ELVDD. A cathode of the light-emitting element ED may be connected to the second voltage line VL2 that transmits a power supply voltage ELVSS, and an anode of the light-emitting element ED may be connected to the sixth and seventh transistors T6 and T7. A structure of the first pixel PX1*ij* according to an embodiment is not limited to the structure illustrated in FIG. 7, and the number of transistors, the number of capacitors, and connecting relationship, which the first pixel PX1*ij* includes, may be variously changed. For example, in another example, the number of the transistors may be less or more than seven, and the number of the capacitors may be more than one.

Figure 8:
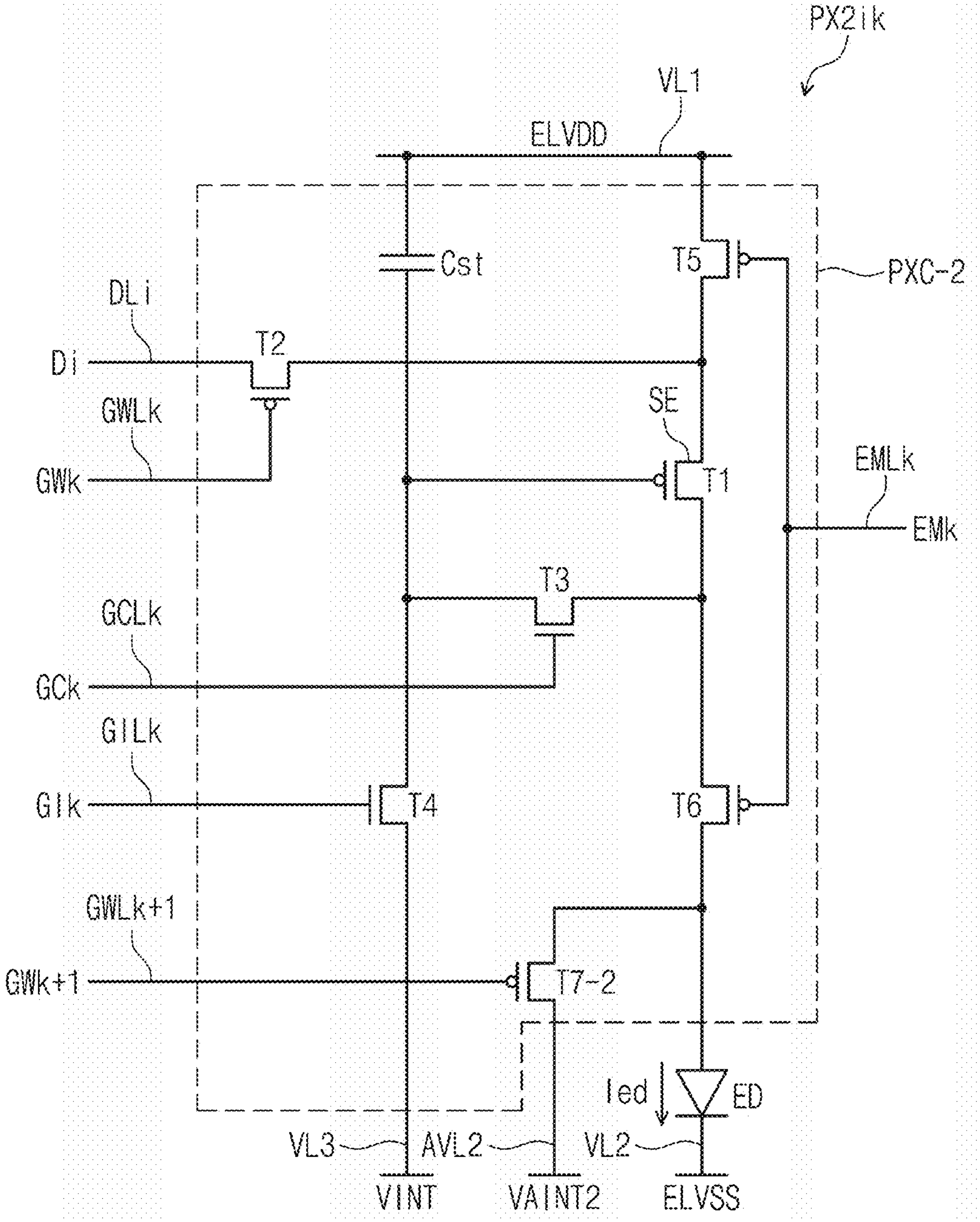
FIG. 8 is an equivalent circuit diagram of a second pixel according to an embodiment of the present disclosure.

FIG. 8 is an equivalent circuit diagram of a second pixel according to an embodiment of the present disclosure. In description of FIG. 8, the same reference numerals or symbols refer to the same components illustrated in FIG. 7 and description thereof may be omitted.

FIG. 8 illustrates an equivalent circuit diagram of a second pixel PX2*ik*, illustrated in FIG. 6, connected to an i-th data line DLi among the data lines DL1 to DLm, k-th scan lines GILk, GCLk, and GWLk, and a (k+1)-th scan line GWLk+1 among the scan lines GIL1 to GILn, GCL1 to GCLn, GWL1 to GWLn+1, and a k-th light-emitting control line EMLk among the light-emitting control lines EML1 to EMLn, illustrated in FIG. 4

The second pixel PX2 illustrated in FIG. 6 may have the same circuit configuration as that of the equivalent circuit diagram of the second pixel PX2*ik* illustrated in FIG. 8.

Referring to FIGS. 6 and 8, the second pixel PX2*ik* includes a second pixel circuit PXC-2 and at least one light-emitting element ED. The second pixel circuit PXC-2 may control light emission of the light-emitting element ED, and the light emitting-element ED may emit a light.

The second pixel circuit PXC-2 includes first to seventh transistors T1, T2, T3, T4, T5, T6, and T7-2 and a capacitor Cst.

The seventh transistor T7-2 includes a first electrode, a second electrode, a gate electrode. The first electrode of the seventh transistor T7-2 is connected to the anode of the light-emitting element ED and one end of the sixth transistor T6, the second electrode of the seventh transistor T7-2 is connected to the second initialization voltage line AVL2, and the gate electrode of the seventh transistor T7-2 is connected to the scan line GWLk+1. The seventh transistor T7-2 may be turned on in response to the scan signal GWk+1 transmitted through the scan line GWLk+1 and may bypass a current of the anode of the light-emitting element ED through the second initialization voltage line AVL2. The second initialization voltage line AVL2 may transmit the second initialization voltage VAINT2.

Figure 9:
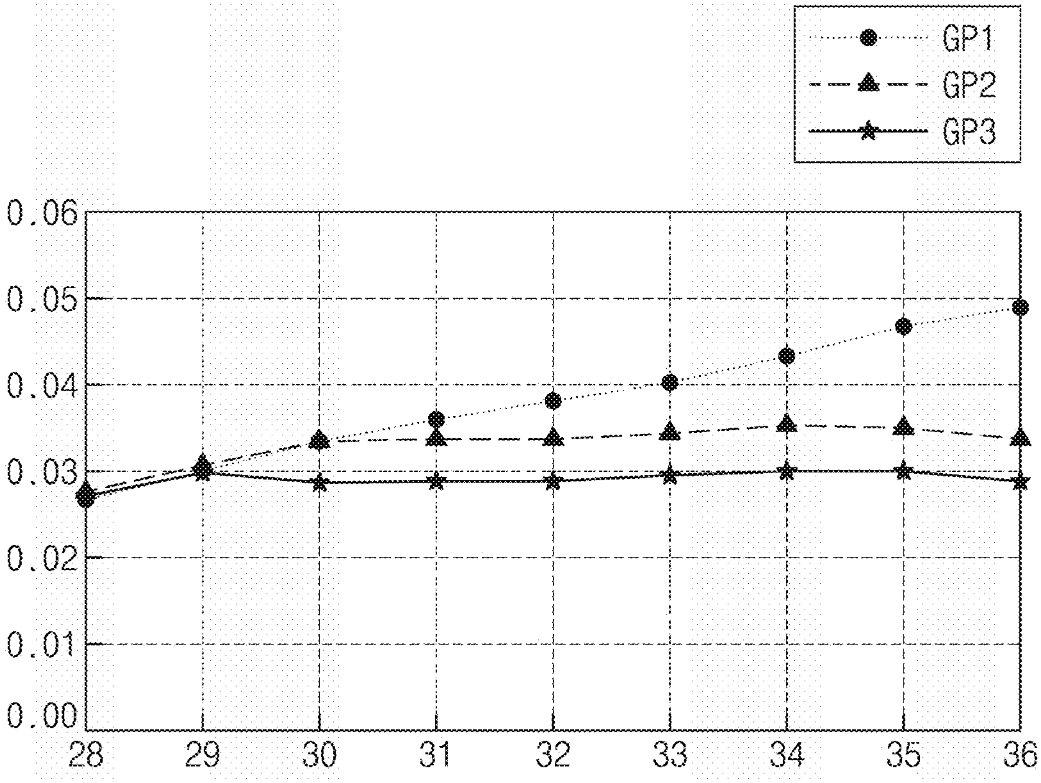
FIG. 9 is a graph showing the luminance versus the temperature of a display panel according to an embodiment of the present disclosure.

FIG. 9 is a graph showing the luminance versus the temperature of a display panel according to an embodiment of the present disclosure.

In FIG. 9, a horizontal axis of the graph may denote a temperature of the display panel DP (see FIG. 6) which is measured by a temperature sensor. A unit of temperature may be ° C. A vertical axis of the graph may denote a luminance value of the display panel DP (see FIG. 6).

Referring to FIGS. 5 to 9, a first graph GP1 shows changes in the luminance value of the second display region DA2 of the display panel DP versus the temperature of the second display region DA2 of the display panel DP when the voltage generator 130 according to Comparative Example of the present disclosure provides the same initialization voltage to the first display region DA1 and the second display region DA2.

For example, when the temperature of the second display region DA2 is about 28 degrees, the luminance value of the second display region DA2 may be about 0.0267. When the temperature of the second display region DA2 is about 29 degrees, the corresponding luminance value of the second display region DA2 may be about 0.03. When the temperature of the second display region DA2 is about 30 degrees, the corresponding luminance value of the second display region DA2 may be about 0.0334. When the temperature of the second display region DA2 is about 31 degrees, the corresponding luminance value of the second display region DA2 may be about 0.0358. When the temperature of the second display region DA2 is about 32 degrees, the corresponding luminance value of the second display region DA2 may be about 0.0379. When the temperature of the second display region DA2 is about 33 degrees, the corresponding luminance value of the second display region DA2 may be about 0.0401. When the temperature of the second display region DA2 is about 34 degrees, the corresponding luminance value of the second display region DA2 may be about 0.0431. When the temperature of the second display region DA2 is about 35 degrees, the corresponding luminance value of the second display region DA2 may be about 0.0461. When the temperature of the second display region DA2 is about 36 degrees, the corresponding luminance value of the second display region DA2 may be about 0.0486.

A second graph GP2 shows changes in the luminance value of the second display region DA2 of the display panel DP versus the temperature of the second display region DA2 of the display panel DP when the voltage generator 130, according to Example of the present disclosure, provides the second initialization voltage VAINT2 to the second display region DA2 of the display panel DP.

For example, when the temperature of the second display region DA2 is about 28 degrees, the corresponding luminance value of the second display region DA2 may be about 0.0274. When the temperature of the second display region DA2 is about 29 degrees, the corresponding luminance value of the second display region DA2 may be about 0.0307. When the temperature of the second display region DA2 is about 30 degrees, the corresponding luminance value of the second display region DA2 may be about 0.0334. Up to this point, the luminance values of the second display region DA2 for the first graph G1 and the second graph G2 may be relatively similar to each other. When the temperature of the second display region DA2 is about 31 degrees, the corresponding luminance value of the second display region DA2 may be about 0.0336 which is less than that of the first graph G1 at 31 degrees. When the temperature of the second display region DA2 is about 32 degrees, the corresponding luminance value of the second display region DA2 may be about 0.0337 which is also less than that of the first graph G1 at 32 degrees. When the temperature of the second display region DA2 is about 33 degrees, the corresponding luminance value of the second display region DA2 may be about 0.0344 which is also less than that of the first graph G1 at 33 degrees. When the temperature of the second display region DA2 is about 34 degrees, the corresponding luminance value of the second display region DA2 may be about 0.035 which is also less than that of the first graph G1 at 34 degrees. When the temperature of the second display region DA2 is about 35 degrees, the corresponding luminance value of the second display region DA2 may be about 0.0348 which is also less than that of the first graph G1 at 35 degrees. When the temperature of the second display region DA2 is about 36 degrees, the corresponding luminance value of the second display region DA2 may be about 0.0336 which is also less than that of the first graph G1 at 36 degrees.

A third graph GP3 shows changes in the luminance value of the first display region DA1 of the display panel DP versus the temperature of the first display region DA1 of the display panel DP when the voltage generator 130 according to Example of the present disclosure provides the first initialization voltage VAINT1 to the first display region DA1 of the display panel DP.

For example, when the temperature of the first display region DA1 is about 28 degrees, the corresponding luminance value of the first display region DA1 may be about 0.0274. When the temperature of the first display region DA1 is about 29 degrees, the corresponding luminance value of the first display region DA1 may be about 0.0297. Up to this point, the luminance values of the second display region DA2 for the first graph G1, the second graph G2, and the third graph G3 may be relatively similar to each other. When the temperature of the first display region DA1 is about 30 degrees, the corresponding luminance value of the first display region DA1 may be about 0.0284 which is less than that of the first graph G1 and the second graph G2 at 30 degrees. When the temperature of the first display region DA1 is about 31 degrees, the corresponding luminance value of the first display region DA1 may be about 0.0286 which is also less than that of the first graph G1 and the second graph G2 at 31 degrees. When the temperature of the first display region DA1 is about 32 degrees, the corresponding luminance value of the first display region DA1 may be about 0.0287 which is also less than that of the first graph G1 and the second graph G2 at 32 degrees. When the temperature of the first display region DA1 is about 33 degrees, the corresponding luminance value of the first display region DA1 may be about 0.0294 which is also less than that of the first graph G1 and the second graph G2 at 33 degrees. When the temperature of the first display region DA1 is about 34 degrees, the corresponding luminance value of the first display region DA1 may be about 0.03 which is also less than that of the first graph G1 and the second graph G2 at 34 degrees. When the temperature of the first display region DA1 is about 35 degrees, the corresponding luminance value of the first display region DA1 may be about 0.0298 which is also less than that of the first graph G1 and the second graph G2 at 35 degrees. When the temperature of the first display region DA1 is about 36 degrees, the corresponding luminance value of the first display region DA1 may be about 0.0286 which is also less than that of the first graph G1 and the second graph G2 at 36 degrees.

According to the first graph GP1 and the third graph GP3, when the temperatures of the first display region DA1 and the second display region DA2 are about 36 degrees, a difference in the luminance value between the first display region DA1 and the second display region DA2 may be about 0.02.

The just noticeable difference (JND) may be defined for evaluating the display quality of the display panel DP. Since each user perceives a luminance of the display panel DP differently, the JND may be used to maintain the same sensory luminance. The JND is a minimum luminance difference which is perceivable by a user. As the JND becomes smaller, a user may less perceive a luminance difference. Accordingly, the smaller the JND is, the more display quality is improved.

According to Comparative Example of the present disclosure, when the voltage generator 130 provides the same initialization voltage to the first display region DA1 and the second display region DA2, a difference in the luminance value between the first display region DA1 and the second display region DA2, at a temperature of 36 degrees, may have the JND value of 5.5.

According to the second graph GP2 and the third graph GP3, when the temperatures of the first display region DA1 and the second display region DA2 are about 36 degrees, a difference in the luminance value between the first display region DA1 and the second display region DA2 may be about 0.005.

According to the present disclosure, the voltage generator 130 may provide optimum initialization voltages VAINT1 and VAINT2 according to the display regions DA1 and DA2 with the temperatures TMP1 and TMP2 which are measured by the temperature sensors 371 and 372, respectively. At a temperature of 36 degrees, a difference in the luminance value between the first display region DA1 and the second display region DA2 may have the JND value of 1.65. For example, the JND may decrease. Accordingly, the electronic device 1000 (see FIG. 3) with improved display quality may be achieved.

Unlike the present disclosure, when the first temperature TMP1 is different from the second temperature TMP2, the voltage generator 130 may provide the same anode initialization voltage VAINT to the first display region DA1 and the second display region DA2. For example, the anode initialization voltage VAINT may be the first initialization voltage VAINT1. In this case, temperature characteristics of the first transistor T1 and the light-emitting element ED may be changed due to a temperature difference between the first temperature TMP1 and the second temperature TMP2. A luminance difference between the first display region DA1 and the second display region DA2 may be spotted by a user. However, according to the present disclosure, the driving controller 110 may output the voltage control signal VCTRL based on the first temperature TMP1 and the second temperature TMP2. The voltage generator 130 may provide, to the display panel DP, the first initialization voltage VAINT1 and the second initialization voltage VAINT2, which are different from each other, based on the voltage control signal VCTRL. For example, the voltage generator 130 may provide the first initialization voltage VAINT1 and the second initialization voltage VAINT2 with the temperature characteristics of the light-emitting element ED. Since the voltage generator 130 differently controls the anode initialization voltage VAINT depending on the temperature of the display panel DP, a luminance difference between the first display region DA1 and the second display region DA2 having different temperatures may be improved. Accordingly, the electronic device 1000 with improved display quality may be achieved.

Figure 10:
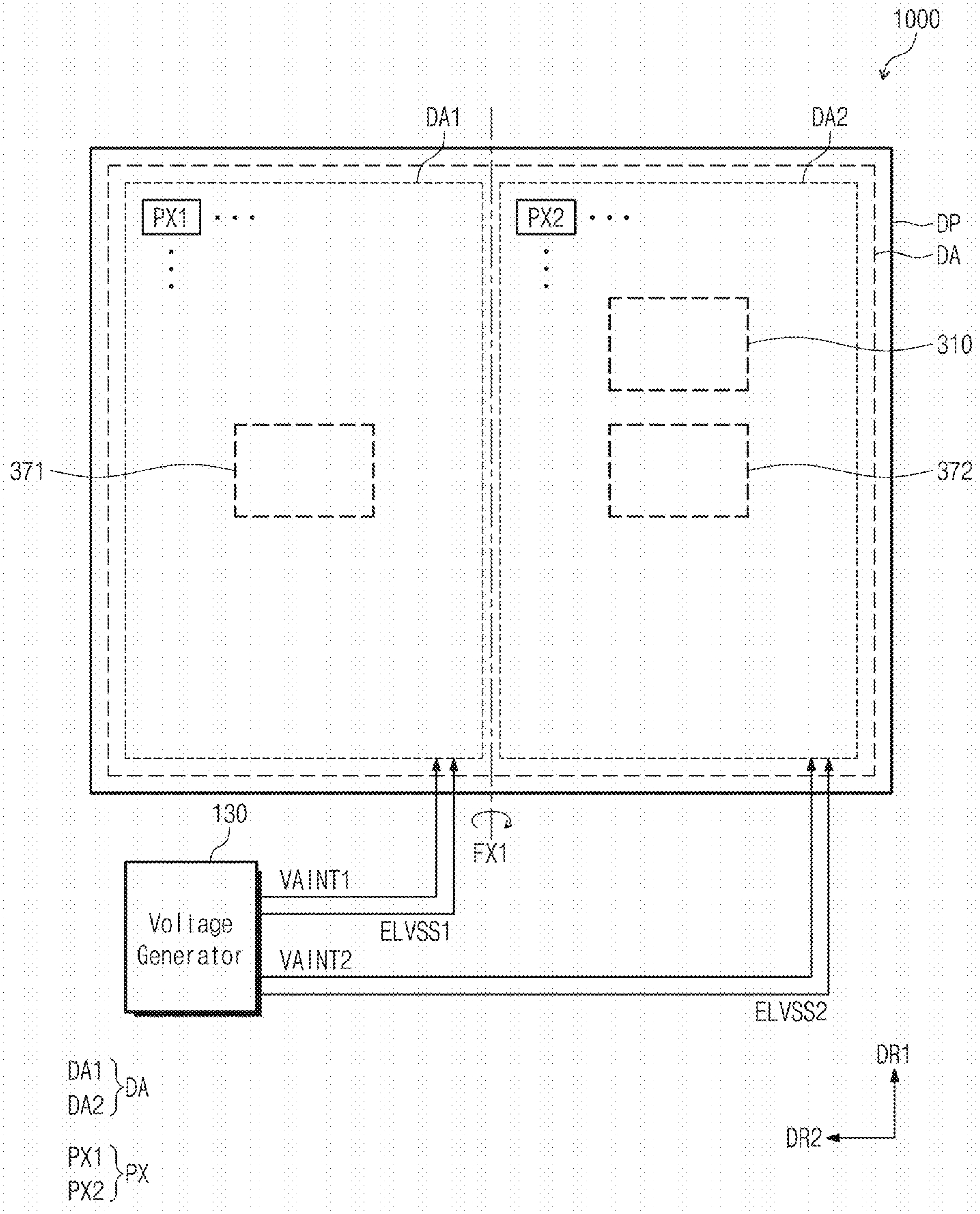
FIG. 10 is a block diagram illustrating a display panel and a voltage generator according to an embodiment of the present disclosure.

FIG. 10 is a block diagram illustrating a display panel and a voltage generator according to an embodiment of the present disclosure. In description of FIG. 10, the same reference numerals or symbols refer to the same components illustrated in FIG. 6 and description thereof may be omitted.

Referring to FIGS. 4, 5, and 10, the electronic device 1000 is folded with respect to a first folding axis FX1, the display panel DP included in the electronic device 1000 may also be folded with respect to the first folding axis FX1. The first folding axis FX1 may be in parallel with the first direction DR1 crossing the second direction DR2. In this case, the electronic device 1000 includes a voltage generator 130, the first temperature sensor 371, and the second temperature sensor 372. The voltage generator 130 may provide the anode initialization voltage VAINT and the power supply voltage ELVSS to the display panel DP based on the voltage control signal VCTRL. The first temperature sensor 371 may be disposed under the first display region DA1. The first temperature sensor 371 may measure a temperature of the first display region DA1. The temperature of the first display region DA1 may be defined as a first temperature TMP1. The second temperature sensor 372 may be disposed under the second display region DA2. The second temperature sensor 372 may measure a temperature of the second display region DA2. The temperature of the second display region DA2 may be defined as a second temperature TMP2.

The anode initialization voltage VAINT may include the first initialization voltage VAINT1 and the second initialization voltage VAINT2. In addition, the power supply voltage ELVSS may include a first voltage ELVSS1 and a second voltage ELVSS2. The voltage generator 130 may provide the first initialization voltage VAINT1 and the first voltage ELVSS1 to the first pixel PX1, and may provide the second initialization voltage VAINT2 and the second voltage ELVSS2 to the second pixel PX2, respectively. The first initialization voltage VAINT1 and the second initialization voltage VAINT2 may have different voltage levels each other. The first voltage ELVSS1 and the second voltage ELVSS2 may have different voltage levels each other.

The processor 310 may be disposed under the second display region DA2. Heat may be generated while the processor 310 controls the electronic device 1000. Accordingly, the first temperature TMP1 may be different from the second temperature TMP2 due to the heat generated by the processor 310. Since the processor 310 is disposed under the second display region DA2, the second temperature TMP2 may be higher than the first temperature TMP1 where is no processor 310 disposed on. When the first temperature TMP1 is lower than the second temperature TMP2, the driving controller 110 may control at least one of the second voltage ELVSS2 or the second initialization voltage VAINT2 so that a voltage value obtained by subtracting the second initialization voltage VAINT2 from the second voltage ELVSS2 is positive. For example, when the second voltage ELVSS2 is about −2.0 V and the second initialization voltage VAINT2 is about −1.9 V, the second voltage ELVSS2 may be changed to about −1.8 V or the second initialization voltage VAINT2 may be changed to about −2.1 V.

According to the present disclosure, based on the first temperature TMP1 and the second temperature TMP2, the voltage generator 130 may provide the first initialization voltage VAINT1 and the first voltage ELVSS1 to the first display region DA1 and provide the second initialization voltage VAINT2 and the second voltage ELVSS2 to the second display region DA2. Since the voltage generator 130 differently controls the anode initialization voltage VAINT and the power supply voltage ELVSS depending on the temperature of the display panel DP, a corresponding luminance difference between the first display region DA1 and the second display region DA2 may be prevented. Accordingly, the electronic device 1000 with improved display quality may be achieved.

Figure 11:
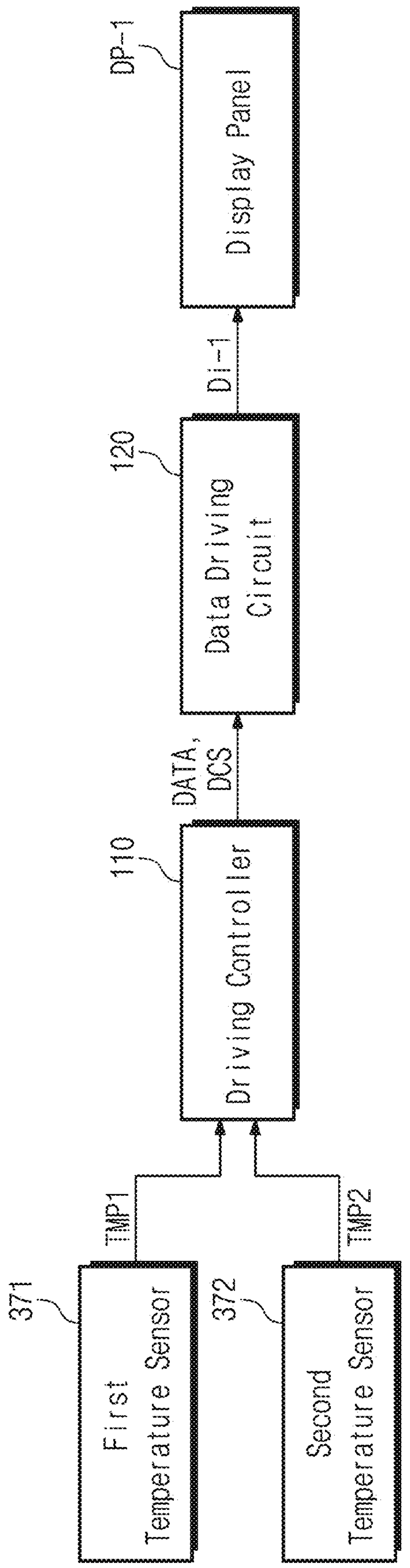
FIG. 11 is a block diagram illustrating that a data signal controls a display panel according to an embodiment of the present disclosure.
Figure 12:
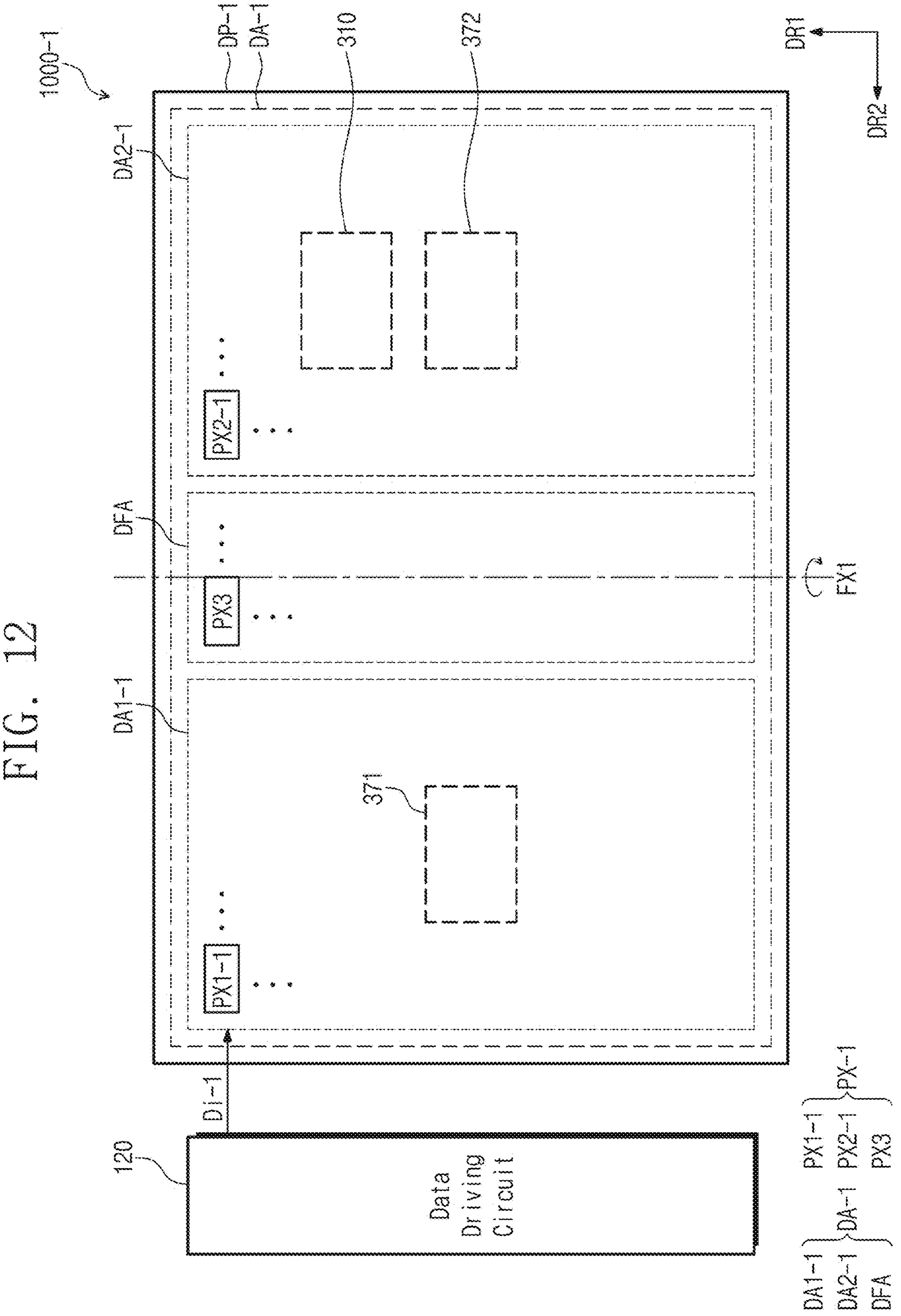
FIG. 12 is a block diagram illustrating a display panel and a data driving circuit according to an embodiment of the present disclosure.
Figure 13:
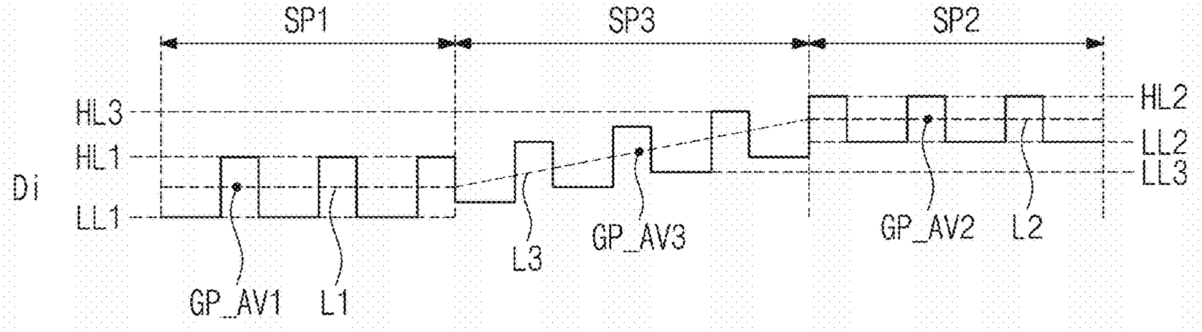
FIG. 13 is a timing diagram illustrating a data signal according to an embodiment of the present disclosure.

FIG. 11 is a block diagram illustrating that a data signal controls a display panel according to an embodiment of the present disclosure. FIG. 12 is a block diagram illustrating a display panel and a data driving circuit according to an embodiment of the present disclosure. FIG. 13 is a timing diagram illustrating a data signal according to an embodiment of the present disclosure.

Referring to FIGS. 4, 11, 12, and 13, as an electronic device 1000-1 is folded with respect to a first folding axis FX1, a display panel DP-1 may also be folded with respect to the first folding axis FX1. The first folding axis FX1 may extend in the first direction DR1 and may be in parallel with the first direction DR1 crossing the second direction DR2.

A display region DA-1 may be defined in the display panel DP-1. The display region DA-1 may include a first display region DA1-1, a second display region DA2-1, and a folding display region DFA interposed therebetween. The second display region DA2-1 may be a region spaced apart from the first display region DA1-1 in the opposite direction of the second direction DR2 with respect to the first folding axis FX1. The folding display region DFA may be a region interposed between the first display region DA1-1 and the second display region DA2-1. The folding display region DFA may be folded with respect to the first folding axis FX1. The first display region DA1-1 and the second display region DA2-1 may be spaced apart from each other with respect to first folding axis FX1.

When viewed on a plane, the first display region DA1-1 may overlap the first non-folding region NFA1 (see FIG. 1A), the second display region DA2-1 may overlap the second non-folding region NFA2 (sec FIG. 1A), and the folding display region DFA may overlap the folding region FA1 (see FIG. 1A).

A plurality of pixels PX-1 may include a first pixel PX1-1, a second pixel PX2-1, and a third pixel PX3. The first pixel PX1-1 may be disposed in the first display region DA1-1, and the second pixel PX2-1 may be disposed in the second display region DA2-1, and the third pixel PX3 may be disposed in the folding display region DFA. For example, each of the pixels, among the plurality of pixels PX-1, disposed in the first display region DA1-1 may be defined as the first pixel PX1-1, each of the pixels, among the plurality of pixels PX-1, disposed in the second display region DA2-1 may be defined as the second pixel PX2-1, and each of pixels, among the plurality of pixels PX-1, disposed in the folding display region DFA may each be defined as the third pixel PX3. In this case, the left portion of the third pixel PX3 may be disposed to left side of the first axis FX1, and the right portion of the third pixel PX3 may be disposed to right side of the first FX1.

A first temperature sensor 371 may be disposed under the first display region DA1-1 and measure a temperature of the first display region DA1-1. The temperature of the first display region DA1-1 may be defined as a first temperature TMP1. The first temperature sensor 371 may transmit the first temperature TMP1 to a driving controller 110.

A second temperature sensor 372 may be disposed under the second display region DA2-1 and measure a temperature of the second display region DA2-1. The temperature of the second display region DA2-1 may be defined as a second temperature TMP2. The second temperature sensor 372 may transmit the second temperature TMP2 to the driving controller 110. In another example, the locations of the first and second temperature sensors 371 and 372 may be differently disposed. For example, the first temperature sensor 371 may be disposed under the second display region DA2-1 and measure a temperature of the second display region DA2-1. The second temperature sensor 372 may be disposed under the first display region DA1-1 and measure a temperature of the first display region DA1-1.

The driving controller 110 may receive the first temperature TMP1 and the second temperature TMP2 and generate a data control signal DCS based on the difference between the first temperature TMP1 and the second temperature TMP2. The driving controller 110 may generate an output of the data control signal DCS to a voltage generator 130. The driving controller 110 may convert a data format of an image signal RGB to comply with specifications of interface with a data driving circuit 120 and generate an output image signal DATA.

The data driving circuit 120 may receive the data control signal DCS and the output image signal DATA from the driving controller 110. The data driving circuit 120 may provide a data signal Di-1 for controlling the plurality of pixels PX-1 to a display panel DP-1 based on the data control signal DCS and the output image signal DATA.

A processor 310 may be disposed under the second display region DA2-1. Heat may be generated while the processor 310 controls the electronic device 1000-1. Accordingly, the first temperature TMP1 may be different from the second temperature TMP2 due to the heat generated by the processor 310 disposed under the second display ergon DA2-1. Since the processor 310 is disposed under the second display region DA2-1, the second temperature TMP2 may be higher than the first temperature TMP1. The data driving circuit 120 may control the data signal Di-1 based on the difference between the first temperature TMP1 and the second temperature TMP2.

The data signal Di-1 may include a first part SP1, a second part SP2, and a third part SP3. In this case, the third part DP3 is interposed between the first and the second part SP1 and SP2. The first part SP1 may be provided to the first display region DA1-1, the second part SP2 may be provided to the second display region DA2-1, and the third part SP3 may be provided to the folding display region DFA.

The data signal Di-1 may include a plurality of high levels HL1, HL2, and HL3 and a plurality of low levels LL1, LL2, and LL3. In this case, the low levels LL1, LL2, and LL3 have relatively lower voltage levels than the high levels HL1, HL2, and HL3. The plurality of high levels HL1, HL2, and HL3 and the plurality of low levels LL1, LL2, and LL3 may be repeated.

The plurality of high levels HL1, HL2, and HL3 may include a first high level HL1, a second high level HL2, and a third high level HL3.

In this case, the first high level HL1 may refer to the high level of the first part SP1. The second high level HL2 may refer to the high level of the second part SP2. The third high level HL3 may refer to the high level of the third part SP3.

The plurality of low levels LL1, LL2, and LL3 may include a first low level LL1, a second low level LL2, and a third low level LL3.

In this case, the first low level LL1 may refer to the low level of the first part SP1. The second low level LL2 may refer to the low level of the second part SP2. The third low level LL3 may refer to the low level of the third part SP3.

The high levels of the first part SP1 and the second part SP2 may be provided in plurality. For example, in the first part SP1, the first high level HL1 may be in plurality, and in the second part SP2, the second high level HL2 may be in plurality. The plurality of first high levels HL1 may have the same value. The plurality of second high levels HL2 may have the same value. However, in this case, the first high level HL1 and the second high level HL2 may be different.

The low levels of the first part SP1 and the second part SP2 may be provided in plurality. The first low level LL1 and the second low level LL2 may be provided in plurality. The plurality of first low levels LL1 may have the same value. The plurality of second low levels LL2 may have the same value. However, in this case, the first low level LL1 and the second low level LL2 may be different.

A first average value GP_AV1 may be an average value of the plurality of first high levels HL1 and the plurality of first low levels LL1. A first line L1 may be a line connecting the first average value GP_AV1 of the first part SP1.

A second average value GP_AV2 may be an average value of the plurality of second high levels HL2 and the plurality of second low levels LL2. A second line L2 may be a line connecting the second average value GP_AV2 of the second part SP2. The first average value GP_AV1 and the second average value GP_AV2 may be different from each other.

A high level and a low level of the third part SP3 may be provided in plurality. The third high level HL3 may be provided in plurality. In the third part SP3, the plurality of third high levels HL3 may have a plurality of values which are different from one another. The third low level LL3 may be provided in plurality, and each of the plurality of third low levels LL3 may have a plurality of values which are different from one another.

A third average value GP_AV3 may be an average value of the plurality of third high levels HL3 and the plurality of third low levels LL3. Unlike the first and second parts SP1 and SP2, the plurality of third high levels HL3 and the plurality of third low levels LL3 may gradually increase in the third part SP3. Accordingly, the third average value GP_AV3 may gradually increase. In this case, the beginning value of the third average GP_AV3 is lower than the end value of the third average GP_AV3. For example, the data driving circuit 120 may gradually increase the third average value GP_AV3 of voltage levels in the third part SP3. A third line L3 may be a line connecting the third average value GP_AV3 of the third part SP3. The third line L3 may have a predetermined slope and may connect the first line L1 with the second line L2.

According to the present disclosure, in the folding display region DFA, the third part SP3 of the data signal Di-1 may gradually increase and thus prevent the luminance difference caused by the first part SP1 and the second part SP2 from being viewed. For example, the visibility of the first display region DA1-1, the second display region DA2-1 and the folding display region DFA may be improved. Accordingly, the electronic device 1000-1 with improved display quality may be achieved.

The plurality of third high levels HL3 of the third part SP3 may be greater than each of the plurality of first high levels HL1 of the first part SP1, and may be smaller than each of the plurality of second high levels HL2 of the second part SP2.

The plurality of third low levels LL3 of the third part SP3 may be greater than the plurality of first low levels LL1 of the first part SP1, and may be smaller than each of the plurality of second low levels LL2 of the second part SP2.

Unlike the present disclosure, when the first temperature TMP1 is different from the second temperature TMP2, the data driving circuit may provide, to the first display region DA1-1 and the second display region DA2-1, a data signal having the same voltage level. In this case, the temperature characteristics of the first transistor T1 (see FIG. 7) and the light-emitting element ED (see FIG. 7) may be changed due to the temperature difference between the first temperature TMP1 and the second temperature TMP2. The luminance difference between the first display region DA1-1 and the second display region DA2-1 may be spotted by a user. However, according to the present disclosure, the driving controller 110 may generate an output of the data control signal DCS and the output image signal DATA based on the first temperature TMP1 and the second temperature TMP2. The data driving circuit 120 may control the data signal Di-1 based on the data control signal DCS and the output image signal DATA. Each of the first pixel PX1-1, the second pixel PX2-1, and the third pixel PX3 may emit light based on the data signal Di-1. For example, the data driving circuit 120 may provide the data signal Di-1 with the temperature characteristics of the first transistor T1 (see FIG. 7). Since the data driving circuit 120 differently controls the voltage level of the data signal Di-1 depending on the temperature of the display panel DP-1, the luminance difference between the first display region DA1-1 and the second display region DA2-1 may be prevented. As the data driving circuit 120 gradually increases the voltage level of the data signal Di-1 in the folding display region DFA, the luminance difference among the first display region DA1-1, the second display region DA2-1, and the folding display region DFA may be prevented. Accordingly, the electronic device 1000-1 with improved display quality may be achieved.

According to the description above, a voltage generator may provide, to a display panel, a first initialization voltage and a second initialization voltage, which are different from each other, based on a first temperature and a second temperature. Since the voltage generator differently controls an anode initialization voltage depending on a temperature of the display panel, a luminance difference between a first display region and a second display region, which have different temperatures from each other, may be improved. Accordingly, an electronic device with improved display quality may be achieved.

In addition, according to the description above, since a data driving circuit differently controls a voltage level of a data signal depending on a temperature of the display panel, the luminance difference between the first display region and the second display region may be prevented. As the data driving circuit gradually increases the voltage level of the data signal in a folding display region, the luminance difference among the first display region, the second display region, and the folding display region may be prevented. Accordingly, an electronic device with improved display quality may be achieved.

In the above, description has been made with reference to preferred embodiments of the present disclosure, but those skilled in the art or those of ordinary skill in the relevant technical field may understand that various modifications and changes may be made to the present disclosure within the scope not departing from the spirit and the technology scope of the present disclosure described in the claims to be described later. Therefore, the technical scope of the present disclosure is not limited to the contents described in the detailed description of the specification, but should be determined by the claims.

What is claimed is:

1. An electronic device comprising:
a display panel including a first display region and a second display region, wherein the first display region is spaced apart from the second display region in a first direction, and wherein the first display region includes a plurality of pixels having a first pixel, and the second display region includes a plurality of pixels having a second pixel;
a first temperature sensor configured to measure a first temperature of the first display region;
a second temperature sensor configured to measure a second temperature of the second display region;
a voltage generator configured to generate a first initialization voltage and a second initialization voltage which is different from the first initialization voltage; and
a driving controller configured to control the voltage generator,
wherein the driving controller generates a voltage control signal based on the first temperature and the second temperature, and
the voltage generator provides the first initialization voltage to the first pixel and the second initialization voltage to the second pixel based on the voltage control signal.

2. The electronic device of claim 1, further comprising a processor configured to drive the driving controller, and
wherein the processor overlaps the display panel.

3. The electronic device of claim 2, wherein, when viewed on a plane, the processor overlaps the second display region.

4. The electronic device of claim 1, wherein, when viewed on a plane, the first temperature sensor overlaps the first display region, and
when viewed on the plane, the second temperature sensor overlaps the second display region.

5. The electronic device of claim 1, wherein the first temperature is different from the second temperature.

6. The electronic device of claim 1, wherein the voltage generator further provides a power supply voltage to the plurality of pixels based on the voltage control signal.

7. The electronic device of claim 6, wherein, when the first temperature is lower than the second temperature, an absolute value of the first initialization voltage is less than an absolute value of the second initialization voltage.

8. The electronic device of claim 6, wherein the power supply voltage includes a first voltage and a second voltage which is different from the first voltage, and
the first voltage is provided to the first pixel and the second voltage is provided to the second pixel.

9. The electronic device of claim 8, wherein, when the first temperature is lower than the second temperature, the driving controller controls at least one of the second voltage or the second initialization voltage so that a voltage value obtained by subtracting the second initialization voltage from the second voltage is positive.

10. The electronic device of claim 1, wherein the display panel is folded with respect to a folding axis in parallel with a second direction crossing the first direction, and
the folding axis is defined by the first display region and the second display region and interposed between the first display region and the second display region.

11. An electronic device comprising:
a display panel including a first display region and a second display region, wherein the first display region and the second display are spaced apart from each other in a first direction, and wherein the first display region includes a plurality of pixels having a first pixel, and the second display region includes a plurality of pixels having a second pixel;
a first temperature sensor configured to measure a first temperature of the first display region;
a second temperature sensor configured to measure a second temperature of the second display region;
a data driving circuit configured to provide a data signal to control each of the plurality of pixels; and
a driving controller configured to control the data driving circuit,
wherein the driving controller generates a data control signal based on a difference between the first temperature and the second temperature, and
the data driving circuit controls the data signal based on the data control signal from the driving controller.

12. The electronic device of claim 11, further comprising a processor configured to drive the driving controller,
wherein the processor overlaps the display panel.

13. The electronic device of claim 12, wherein, when viewed on a plane, the processor overlaps the second display region.

14. The electronic device of claim 11, wherein, when viewed on a plane, the first temperature sensor overlaps the first display region, and
when viewed on the plane, the second temperature sensor overlaps the second display region.

15. The electronic device of claim 11, wherein the first temperature is different from the second temperature.

16. The electronic device of claim 11, wherein the data signal includes a first portion provided to the first display region and a second portion provided to the second display region, and
a first average value of a voltage level in the first portion is different from a second average value of a voltage level in the second portion.

17. The electronic device of claim 16, wherein the first average value is lower than the second average value.

18. The electronic device of claim 16, wherein a folding display region interposed between the first display region and the second display region is further defined in the display panel, and
the folding display region is foldable with respect to a folding axis in parallel with a second direction crossing the first direction.

19. The electronic device of claim 18, wherein the data signal further includes a third portion provided to the folding display region,
the third portion is provided between the first portion and the second portion, and
the data driving circuit gradually increases a third average value of a voltage level in the third portion.

20. An electronic device comprising:
a display panel including a first display region, a second display region, and a folding display region, wherein the first display region, the second display, and the folding display region are spaced apart from each other in a first direction, wherein the folding display region is interposed between the first and second display regions, and wherein the first display region includes a plurality of first pixels, the second pixel includes a plurality of second pixels, and the folding display region includes a plurality of third pixels;

a first temperature sensor configured to measure a first temperature of the first display region;

a second temperature sensor configured to measure a second temperature of the second display region;

a data driving circuit configured to provide a data signal to control each of the plurality of pixels;

a driving controller configured to control the data driving circuit; and a processor configured to drive the driving controller and disposed under the second display region, wherein the driving controller generates a data control signal based on a difference between the first temperature and the second temperature, wherein the data driving circuit controls the data signal based on the data control signal from the driving controller, wherein the data signal includes a first portion provided to the first display region, a second portion provided to the second display region, and a third portion provided to the folding display region, wherein the data signal includes a plurality of high levels and a plurality of low levels respectively having lower voltage level than the plurality of high levels, wherein the plurality of high levels include first, second, and third high levels, and the plurality of low levels include first, second, and third low levels, wherein each of the plurality of high levels in the third portion is greater than the plurality of high levels in the first portion, and smaller than the plurality of high levels in the second portion, and wherein each of the plurality of low levels in the third portion is greater than the plurality of low levels in the first portion, and smaller than the plurality of low levels in the second portion.

* * * * *